US012019835B2

(12) United States Patent
Moy et al.

(10) Patent No.: US 12,019,835 B2
(45) Date of Patent: *Jun. 25, 2024

(54) METAL MESH TOUCH ELECTRODES WITH VISIBILITY MITIGATIONS

(71) Applicant: Apple Inc., Cupertino, CA (US)

(72) Inventors: Tiffany Tang Moy, Redwood City, CA (US); Tsung-Ting Tsai, San Jose, CA (US); Warren S. A. Rieutort-Louis, Cupertino, CA (US); Aleksandr N. Polyakov, San Jose, CA (US); Chuang Qian, Santa Clara, CA (US); Sabino Joseph Pietrangelo, II, Mountain View, CA (US); Abbas Jamshidi-Roudbari, Saratoga, CA (US); Rui Liu, San Jose, CA (US); Yurii Morozov, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/807,059

(22) Filed: Jun. 15, 2022

(65) Prior Publication Data

US 2022/0317820 A1    Oct. 6, 2022

Related U.S. Application Data

(63) Continuation of application No. 16/862,327, filed on Apr. 29, 2020, now Pat. No. 11,366,558.
(Continued)

(51) Int. Cl.
 *G06F 3/044* (2006.01)
 *G06F 3/041* (2006.01)

(52) U.S. Cl.
 CPC .......... *G06F 3/0446* (2019.05); *G06F 3/0445* (2019.05); *G06F 2203/04112* (2013.01)

(58) Field of Classification Search
None
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 103282863 A | 9/2013 |
| CN | 103376938 A | 10/2013 |

(Continued)

OTHER PUBLICATIONS

Corrected Notice of Allowability received for U.S. Appl. No. 16/530,955, dated Feb. 1, 2021, 3 pages.
(Continued)

*Primary Examiner* — Krishna P Neupane
(74) *Attorney, Agent, or Firm* — Kubota & Basol LLP

(57) ABSTRACT

Visibility of the metal mesh touch electrodes can be mitigated using one or more mitigation techniques. In some examples, the boundary between touch electrodes and/or the boundary between a touch electrode and a routing trace of another touch electrode and/or the boundary between two routing traces can be non-linear. In some examples, dummy cuts can be made within an area of a touch electrode region (e.g., while maintaining the same electrical potential for the touch electrode region). In some examples, notches can be made in the metal mesh. In some examples, the location of cuts and/or notches can be optimized to mitigate visibility of the metal mesh. In some examples, some or all of the visibility mitigations may be used in combination in a touch screen.

18 Claims, 19 Drawing Sheets

Related U.S. Application Data

(60) Provisional application No. 62/879,405, filed on Jul. 26, 2019.

(56) References Cited

U.S. PATENT DOCUMENTS

| | | |
|---|---|---|
| 5,825,352 A | 10/1998 | Bisset et al. |
| 5,835,079 A | 11/1998 | Shieh |
| 5,880,411 A | 3/1999 | Gillespie et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,690,387 B2 | 2/2004 | Zimmerman et al. |
| 7,015,894 B2 | 3/2006 | Morohoshi |
| 7,184,064 B2 | 2/2007 | Zimmerman et al. |
| 7,663,607 B2 | 2/2010 | Hotelling et al. |
| 8,479,122 B2 | 7/2013 | Hotelling et al. |
| 9,495,050 B1 | 11/2016 | Hoshtanar et al. |
| 9,658,726 B2 | 5/2017 | Rowe et al. |
| 9,684,417 B2 | 6/2017 | Lu et al. |
| 10,845,902 B2 | 11/2020 | Clark et al. |
| 2006/0197753 A1 | 9/2006 | Hotelling |
| 2010/0079402 A1 | 4/2010 | Grunthaner et al. |
| 2010/0309160 A1 | 12/2010 | Lin |
| 2011/0007020 A1 | 1/2011 | Hong et al. |
| 2011/0102361 A1 | 5/2011 | Philipp |
| 2011/0157043 A1 | 6/2011 | Lai et al. |
| 2012/0062250 A1 | 3/2012 | Kuo |
| 2012/0268418 A1 | 10/2012 | Ishizaki et al. |
| 2012/0327012 A1 | 12/2012 | Hoch |
| 2013/0100054 A1 | 4/2013 | Philipp |
| 2013/0162596 A1 | 6/2013 | Kono et al. |
| 2013/0181942 A1 | 7/2013 | Bulea et al. |
| 2013/0222297 A1 | 8/2013 | Adachi |
| 2013/0234734 A1 | 9/2013 | Iida et al. |
| 2013/0257785 A1 | 10/2013 | Brown et al. |
| 2013/0278513 A1 | 10/2013 | Jang |
| 2013/0278560 A1* | 10/2013 | Yamaguchi ........... G06F 3/0445 345/174 |
| 2014/0078068 A1 | 3/2014 | Jones et al. |
| 2014/0098304 A1 | 4/2014 | Kim et al. |
| 2014/0225839 A1 | 8/2014 | Dunphy et al. |
| 2014/0225859 A1 | 8/2014 | Badaye et al. |
| 2014/0332256 A1* | 11/2014 | Cok .................... H05K 1/0274 174/253 |
| 2014/0347319 A1 | 11/2014 | Lin et al. |
| 2015/0028894 A1 | 1/2015 | Sleeman |
| 2015/0286308 A1 | 10/2015 | Guard |
| 2015/0331288 A1 | 11/2015 | Hsieh et al. |
| 2016/0062499 A1 | 3/2016 | Pedder et al. |
| 2016/0091998 A1 | 3/2016 | Chyan |
| 2016/0349890 A1 | 12/2016 | Weng et al. |
| 2016/0357303 A1 | 12/2016 | Xie et al. |
| 2017/0192568 A1 | 7/2017 | Kim et al. |
| 2017/0199412 A1* | 7/2017 | Suto ..................... H05K 1/02 |
| 2018/0059843 A1 | 3/2018 | Kim |
| 2018/0088727 A1* | 3/2018 | Gwon ................ H10K 59/1216 |
| 2018/0157354 A1 | 6/2018 | Blondin et al. |
| 2018/0190723 A1* | 7/2018 | Han ..................... G06F 3/0446 |
| 2018/0348948 A1 | 12/2018 | Lee et al. |
| 2019/0025955 A1 | 1/2019 | Vandermeijden |
| 2019/0050104 A1* | 2/2019 | Na ..................... G06F 3/044 |
| 2019/0064965 A1 | 2/2019 | Yoon et al. |
| 2019/0179445 A1 | 6/2019 | Moon |
| 2020/0012386 A1 | 1/2020 | Zhang et al. |
| 2020/0042120 A1 | 2/2020 | Gogte et al. |
| 2020/0310586 A1* | 10/2020 | Ding .................. H01L 51/5237 |
| 2021/0026498 A1 | 1/2021 | Moy et al. |

FOREIGN PATENT DOCUMENTS

| | | |
|---|---|---|
| CN | 104969154 A | 10/2015 |
| CN | 106662954 A | 5/2017 |
| CN | 107871470 A | 4/2018 |
| CN | 108054193 A | 5/2018 |
| CN | 108281460 A | 7/2018 |
| CN | 108874228 A | 11/2018 |
| CN | 108958534 A | 12/2018 |
| CN | 110034168 A | 7/2019 |
| JP | 2000-163031 A | 6/2000 |
| JP | 2002-342033 A | 11/2002 |
| JP | 2013143045 A | 7/2013 |
| JP | 2016-1408 A | 1/2016 |
| KR | 10-2015-0046636 A | 4/2015 |
| KR | 10-2017-0051713 A | 5/2017 |
| KR | 10-2018-0079025 A | 7/2018 |
| KR | 10-2018-0130077 A | 12/2018 |
| KR | 10-2019-0055940 A | 5/2019 |
| WO | 2005/114369 A2 | 12/2005 |
| WO | 2005/114369 A3 | 1/2006 |
| WO | 2012/090405 A1 | 7/2012 |

OTHER PUBLICATIONS

Extended European Search Report received for European Patent Application No. 15179799.0, dated Feb. 5, 2016, 6 pages.
Extended European Search Report received for European Patent Application No. 20187192.8, dated Dec. 14, 2020, 11 pages.
Final Office Action received for U.S. Appl. No. 14/475,368, dated Feb. 9, 2017, 21 pages.
Final Office Action received for U.S. Appl. No. 16/862,327, dated Sep. 7, 2021, 25 pages.
International Search Report received for PCT Patent Application No. PCT/US2019/45009, dated Oct. 10, 2019, 4 pages.
Non-Final Office Action received for U.S. Appl. No. 14/475,368, dated May 18, 2016, 17 pages.
Non-Final Office Action received for U.S. Appl. No. 16/530,955, dated Jul. 8, 2020, 13 pages.
Non-Final Office Action received for U.S. Appl. No. 16/862,327, dated Mar. 18, 2021, 23 pages.
Non-Final Office Action received for U.S. Appl. No. 16/862,327, dated May 4, 2021, 23 pages.
Notice of Allowance received for U.S. Appl. No. 16/862,327, dated Mar. 8, 2022, 7 pages.
Notice of Allowance received for U.S. Appl. No. 16/530,955, dated Jan. 11, 2021, 8 pages.
Pre-Brief Appeal Conference Decision received for U.S. Appl. No. 14/475,368, mailed on Jul. 24, 2017, 2 pages.
Supplemental Notice of Allowance received for U.S. Appl. No. 16/862,327, dated Apr. 8, 2022, 2 Pages.
Lee et al., "A Multi-Touch Three Dimensional Touch-Sensitive Tablet", CHI'85 Proceedings, Apr. 1985, pp. 21-25.
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Search Report received for Chinese Patent Application No. 202010722750.5, mailed on Mar. 18, 2024, 5 pages (2 pages of English Translation and 3 pages of Official Copy).

* cited by examiner

METAL MESH TOUCH ELECTRODES WITH VISIBILITY MITIGATIONS

CROSS REFERENCE TO RELATED APPLICATIONS

This application is a continuation of U.S. application Ser. No. 16/862,327, filed Apr. 29, 2020, which claims the benefit under 35 U.S.C. 119(e) of U.S. Provisional Application No. 62/879,405, filed Jul. 26, 2019, the contents of which are incorporated herein by reference in their entireties for all purposes.

FIELD OF THE DISCLOSURE

This relates generally to touch sensor panels, and more particularly to touch sensor panels including metal mesh touch electrodes and techniques for mitigating visibility of the metal mesh touch electrodes.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stackup (i.e., the stacked material layers forming the display pixels).

BRIEF SUMMARY OF THE DISCLOSURE

This relates to touch sensor panels including metal mesh touch electrodes and techniques for mitigating visibility of the metal mesh touch electrodes. Metal mesh touch electrodes can be formed in a metal mesh layer and a boundary between adjacent electrodes may be defined by cuts (also referred to herein as electrical discontinuities) in the metal mesh. In some examples, metal mesh touch electrodes may be visible to a user while the display is on and/or off. To reduce the visibility of the metal mesh touch electrodes, in some examples, the boundary between touch electrodes can be non-linear (with electrical discontinuities in the metal mesh in a non-linear pattern proceeding along the boundary). In some examples, the boundary between a touch electrode and a routing trace of another touch electrode and/or the boundary between two routing traces can similarly be non-linear. In some examples, dummy cuts (electrical discontinuities in the metal mesh) can be made within an area of a touch electrode region (e.g., while maintaining the same electrical potential for the touch electrode region). In some examples, notches can be made in the metal mesh. In some examples, the location of cuts and/or notches can be optimized to mitigate visibility of the metal mesh. In some examples, some or all of the visibility mitigations described herein may be used in combination in a touch screen.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates to touch sensor panels including metal mesh touch electrodes and techniques for mitigating visibility of the metal mesh touch electrodes. Metal mesh touch electrodes can be formed in a metal mesh layer and a boundary between adjacent electrodes may be defined by cuts (also referred to herein as electrical discontinuities) in the metal mesh. In some examples, metal mesh touch electrodes may be visible to a user while the display is on and/or off. To reduce the visibility of the metal mesh touch electrodes, in some examples, the boundary between touch electrodes can be non-linear (with electrical discontinuities in the metal mesh in a non-linear pattern proceeding along the boundary). In some examples, the boundary between a touch electrode and a routing trace of another touch electrode and/or the boundary between two routing traces can similarly be non-linear. In some examples, dummy cuts (electrical discontinuities in the metal mesh) can be made within an area of a touch electrode region (e.g., while maintaining the same electrical potential for the touch electrode region). In some examples, notches can be made in the metal mesh. In some examples, the location of cuts and/or notches can be optimized to mitigate visibility of the metal mesh. In some examples, some or all of the visibility mitigations described herein may be used in combination in a touch screen.

Figure 1A:
FIGS. 1A-1E illustrate example systems that can include a touch screen according to examples of the disclosure.
Figure 1B:
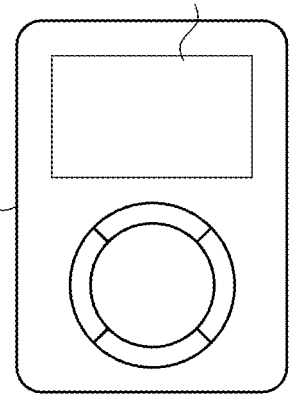
Figure 1C:
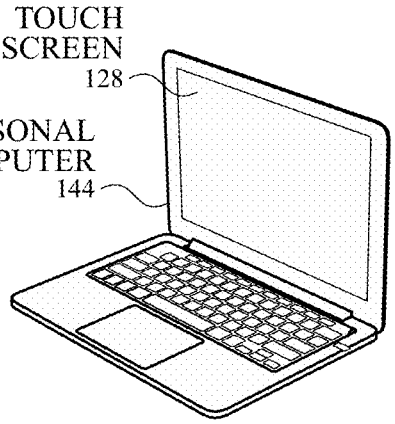
Figure 1D:
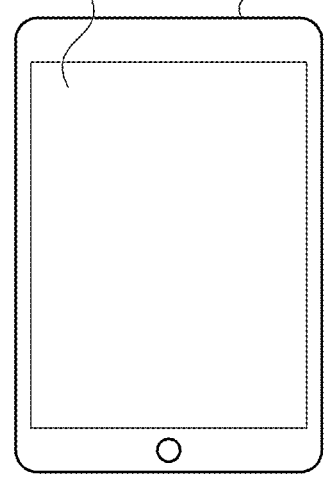
Figure 1E:
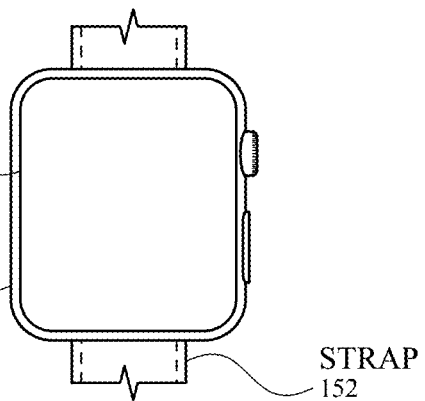

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
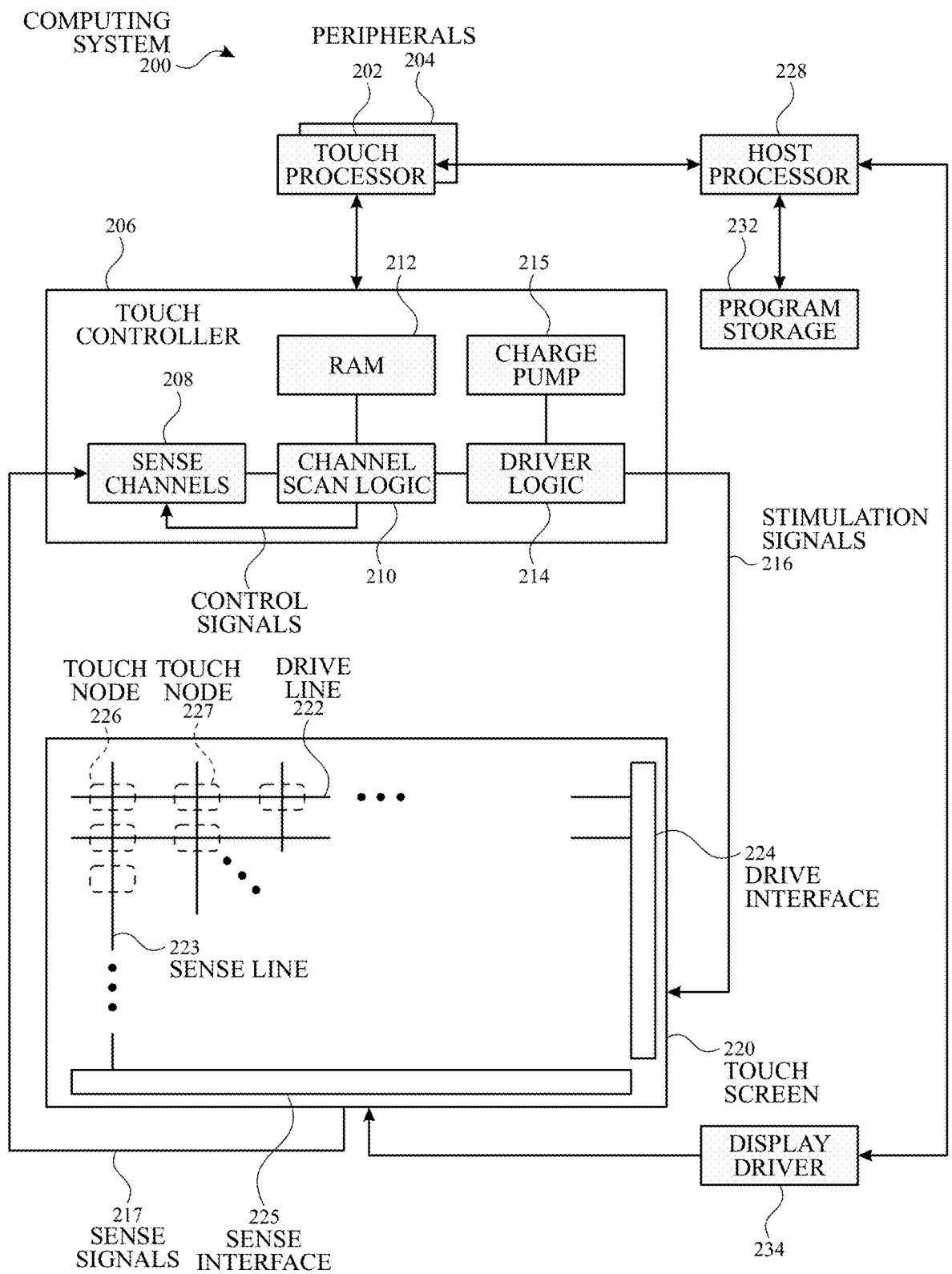
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein, can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to drive logic 214 via drive interface 224 and sense lines 223 may be directly connected to sense channels 208 or indirectly connected to sense channels 208 via sense interface 225. In either case an electrical path for driving and/or sensing the touch nodes can be provided.

Figure 3A:
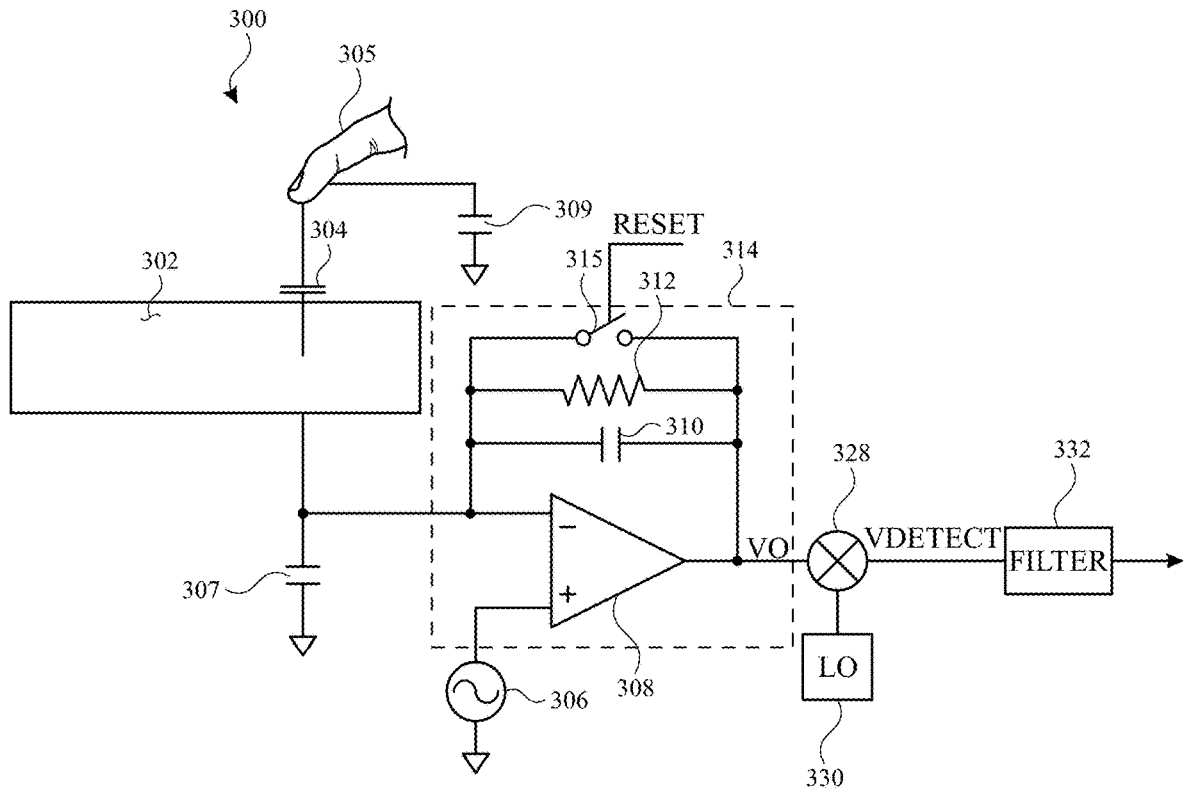
FIG. 3A illustrates an exemplary touch sensor circuit corresponding to a self-capacitance measurement of a touch node electrode and sensing circuit according to examples of the disclosure.

FIG. 3A illustrates an exemplary touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
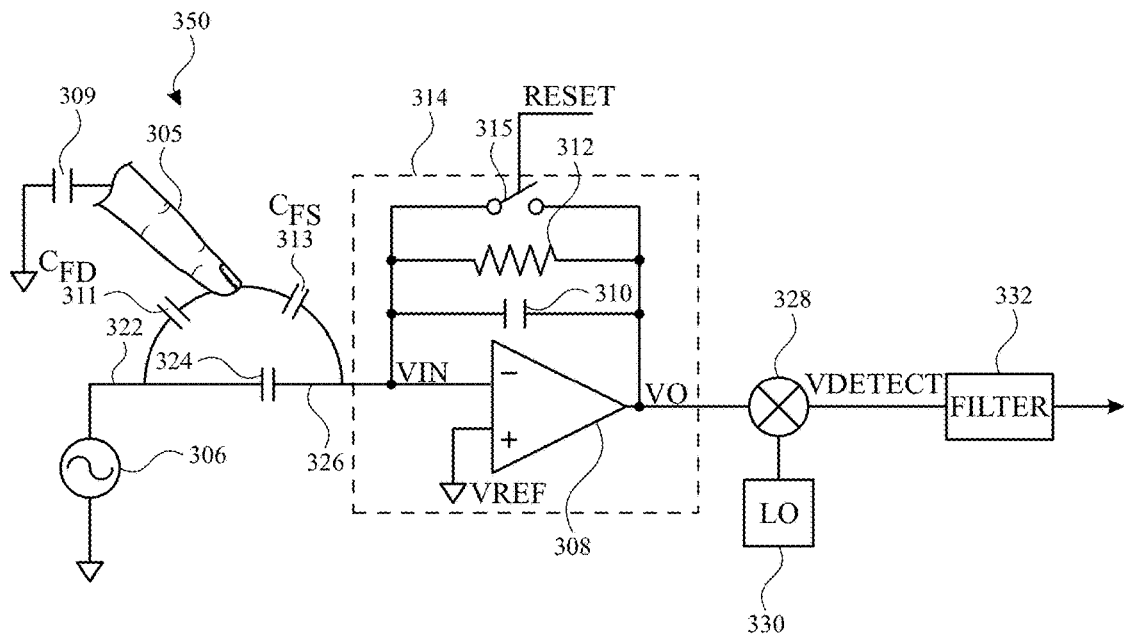
FIG. 3B illustrates an exemplary touch sensor circuit corresponding to a mutual-capacitance drive line and sense line and sensing circuit according to examples of the disclosure.

FIG. 3B illustrates an exemplary touch sensor circuit 350 corresponding to a mutual-capacitance drive line 322 and sense line 326 and sensing circuit 314 according to examples of the disclosure. Drive line 322 can be stimulated by stimulation signal 306 (e.g., an AC voltage signal). Stimulation signal 306 can be capacitively coupled to sense line 326 through mutual capacitance 324 between drive line 322 and the sense line. When a finger or object 305 approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$, and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and blocks 328, 332 and 330 may be implemented in a digital fashion (e.g., 328 can be a digital demodulator, 332 can be a digital filter, and 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor.

Figure 4B:
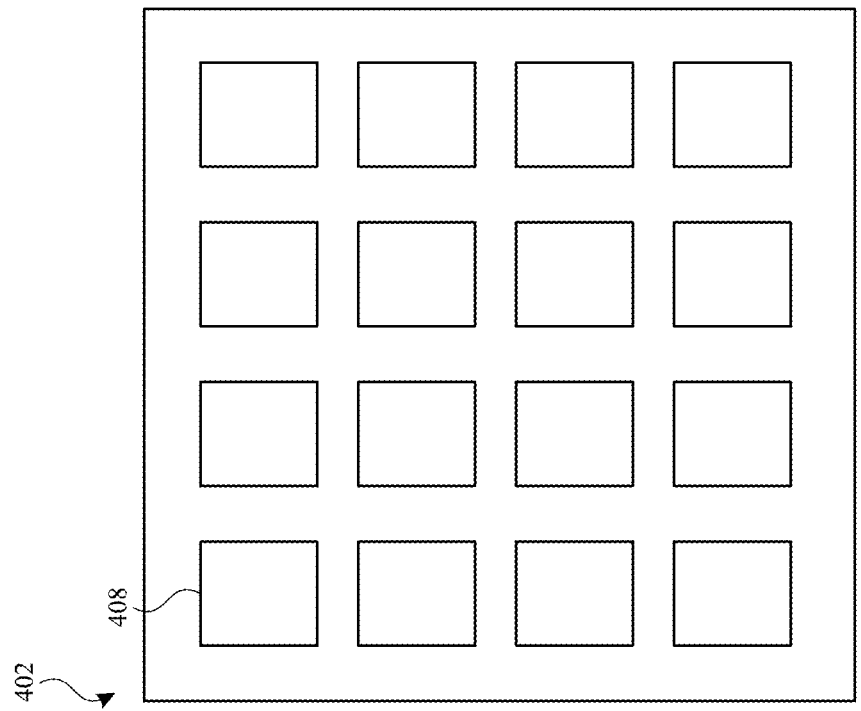
FIG. 4B illustrates touch screen with touch node electrodes arranged in a pixelated touch node electrode configuration according to examples of the disclosure.
Figure 4A:
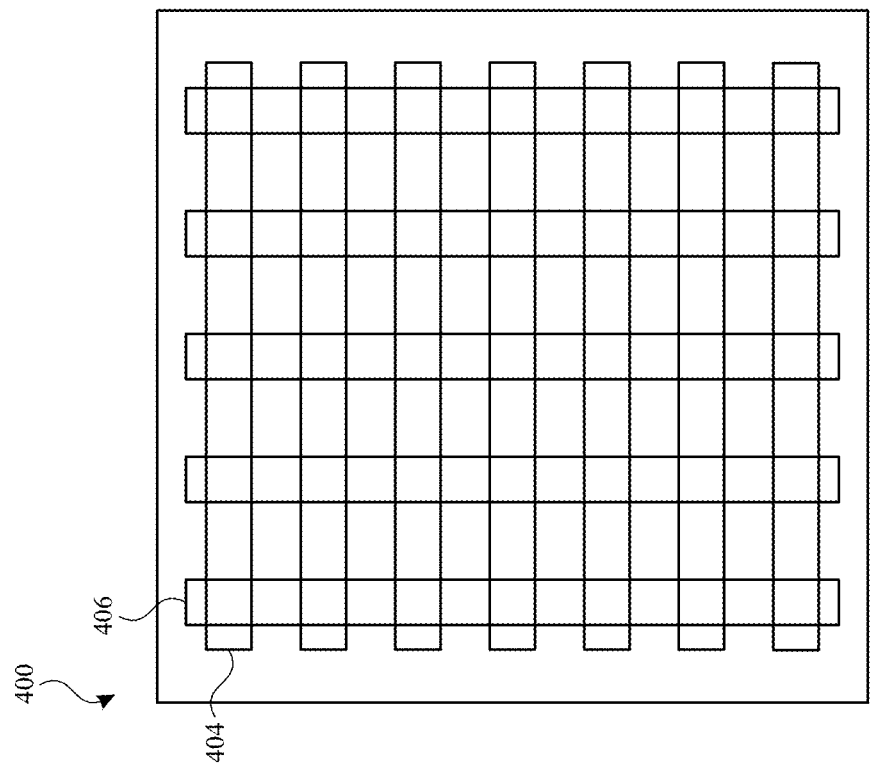
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Figure 4C:
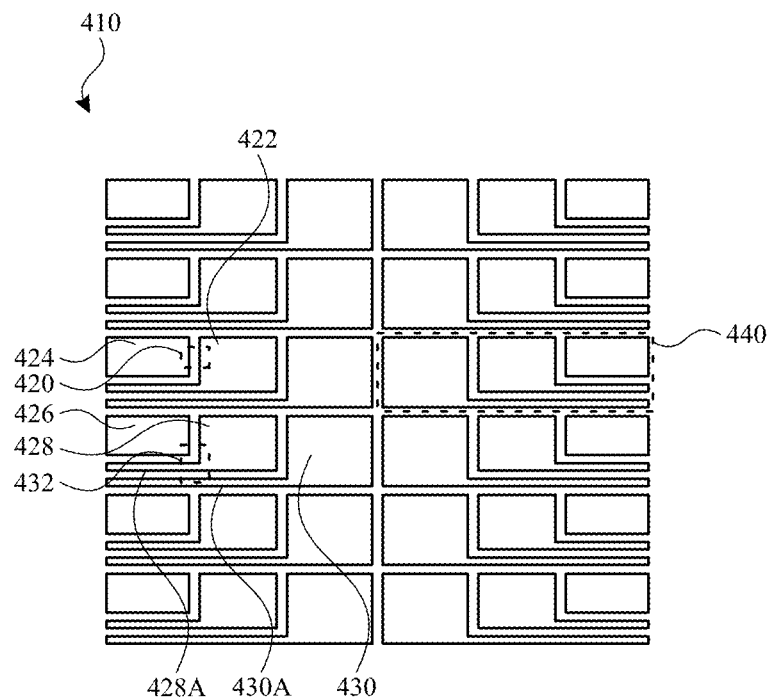
FIG. 4C illustrates touch screen with touch node electrodes and corresponding routing arranged in a pixelated touch node electrode configuration according to examples of the disclosure.

FIG. 4C illustrates touch screen 410 with touch node electrodes (e.g., including touch node electrodes 422, 424, 426, 428 and 430) and corresponding routing (e.g., including routing 428A and 430A) arranged in a pixelated touch node electrode configuration according to examples of the disclosure. Touch screen 410 can be similar to touch screen 402, but can also illustrate corresponding routing of the touch node electrodes. Specifically, touch screen 410 can include a plurality of individual touch node electrodes, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. The touch nodes can be routed to edges of the touch screen 410 (and from the edges of the touch screen 410 to touch controller 206). For example, touch node electrode 428 can be routed to the edge of touch screen 410 via routing trace 428A and touch node electrode 430 can be routed to the edge of touch screen 410 via routing trace 430A. The touch node electrodes and routing can be on the same material layer (as shown) or on different material layers (e.g., routing can be achieved via a different layer connected with vias) of touch screen 410. In some examples, touch screen 410 can sense the self-capacitance of the touch node electrodes or the mutual capacitance between the touch node electrodes to detect touch and/or proximity activity on touch screen 410.

Figure 5A:
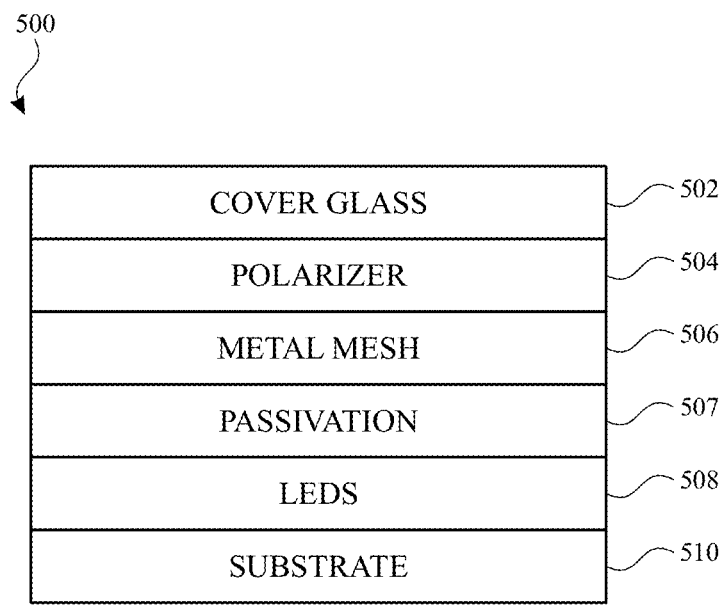
FIG. 5A illustrates an example touch screen stack-up including a metal mesh layer according to examples of the disclosure.

As described herein, in some examples, touch electrodes of the touch screen can be formed from a metal mesh. FIG. 5A illustrates an example touch screen stack-up including a metal mesh layer according to examples of the disclosure. Touch screen 500 can include a substrate 509 (e.g., a printed circuit board) upon which display LEDs 508 can be mounted. In some examples, the LEDs 508 can be partially or fully embedded in substrate 509 (e.g., the components can be placed in depressions in the substrate). Substrate 509 can include routing traces in one or more layers to route the LEDs to display driving circuitry (e.g., display driver 234). The stack-up of touch screen 500 can also include a passivation layer 507 (e.g., transparent epoxy) deposited over the LEDs 508. The passivation layer 507 can planarize the surface for the metal mesh layer. A metal mesh layer 506 (e.g., copper, silver, etc.) can be deposited on the planarized surface of the passivation layer 507 over the display LEDs 508 (over the visible area of the display). In some examples, the passivation layer 507 can include material to encapsulate the LEDs to protect them from corrosion or other environmental exposure. Metal mesh layer 506 can include a pattern of conductor material in a mesh pattern described below. The touch electrodes can be formed in the metal mesh layer from portions of the metal mesh. In some examples, Polarizer 504 can be disposed above the metal mesh layer 506 (optionally with another planarization layer disposed over the metal mesh layer 506). Cover glass (or front crystal) 502 can be disposed over polarizer 502 and form the outer surface of touch screen 500.

Figure 5B:
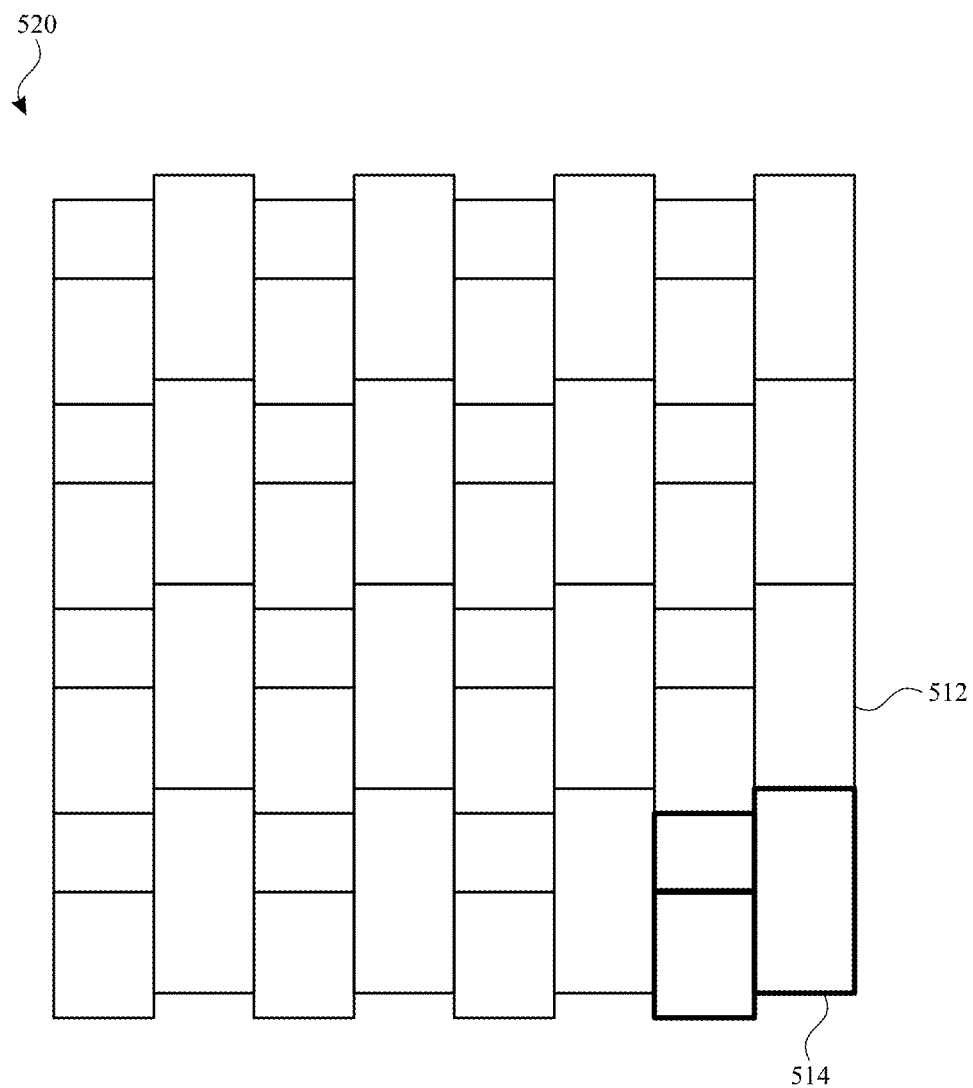
FIGS. 5B and 5C illustrate top views of a portion of a touch screen according to examples of the disclosure.
Figure 5C:
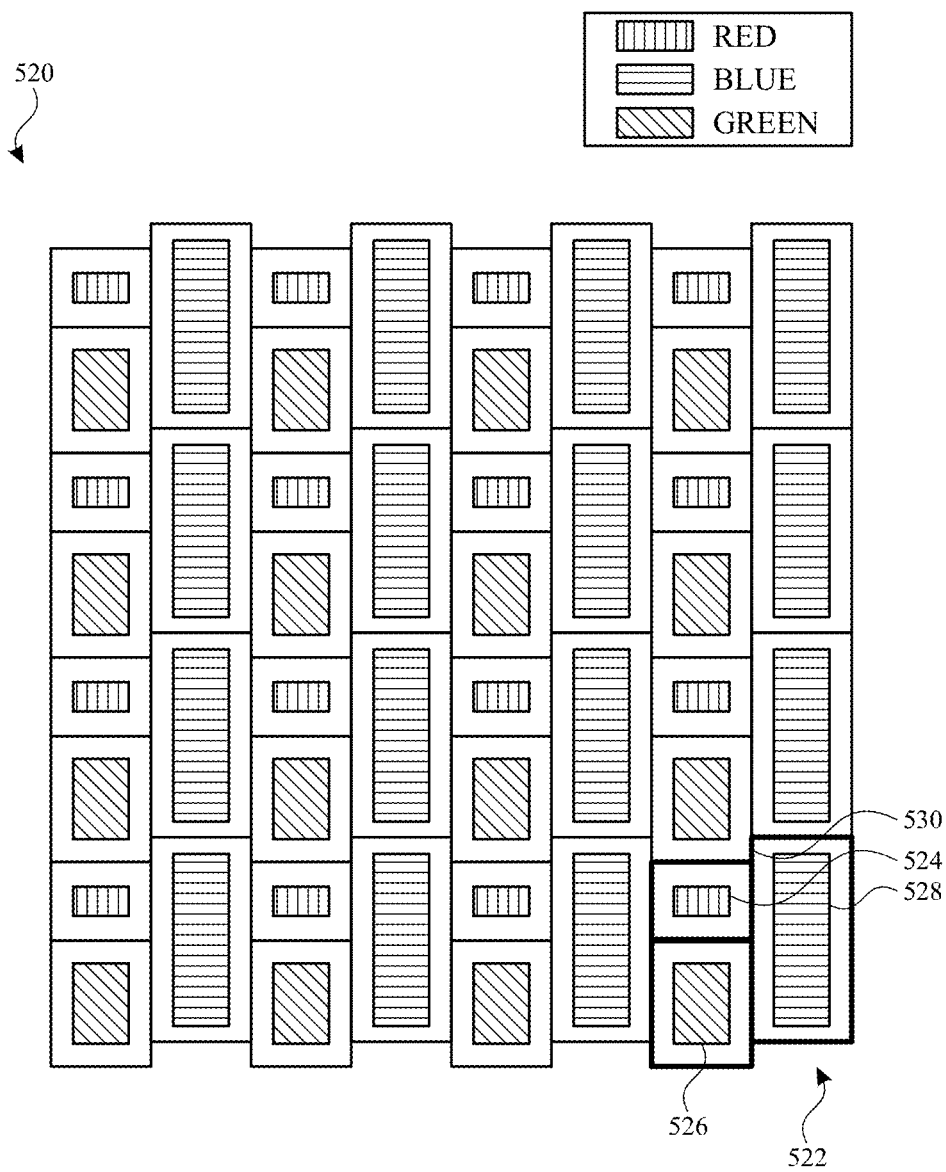

FIGS. 5B and 5C illustrate top views 510 and 520 of a portion of touch screen 500 according to examples of the disclosure. Top view 510 shows metal mesh 512 (e.g., a portion of metal mesh layer 506) without LEDs 508, and top view 520 shows a portion of metal mesh layer 506 together with LEDs 508 of touch screen 500. The LEDs can be arranged in groups of three proximate LEDs, including a red LED, a green LED, and a blue LED, to form standard red-green-blue (RGB) display pixels. Although primarily described herein in terms of an RGB display pixel, it is understood that other touch pixels are possible with different numbers of LEDs and/or different color LEDs. The metal mesh can be formed of conductors disposed in a pattern to allow light to pass (at least vertically) through the gaps in the mesh (e.g., the LEDs 508 can be disposed in the LED layer opposite openings in the metal mesh disposed in the metal mesh layer 506). In other words, the conductors of metal mesh layer can be patterned so that conceptually flattening the metal mesh layer and LEDs into the same layer, the conductors and the LEDs do not overlap.

FIG. 5B includes example metal mesh unit 514 (shown in bold) and FIG. 5C includes example unit 522 including an example display pixel and corresponding metal mesh unit (shown in bold). Metal mesh unit 514 can form three polygons (e.g., three rectangles) around the red, green and blue LEDs forming an RGB display pixel. In some examples, the metal mesh unit 514 can repeat across touch-sensitive area of touch screen 500. Example unit 522 includes a display pixel with a red LED 524, a green LED 526, and a blue LED 528. The corresponding metal mesh can be formed of conductive material 530 (e.g., a metallic conductor such as copper, silver, etc.) disposed in the metal mesh layer around the perimeter of the LEDs (optionally with some space between the LED and the metal material in the plane of the touch screen). The metal mesh can, in some examples, form a rectangular shape around each of the LEDs, as illustrated in FIG. 5C. The pattern of LEDs forming the display pixels can be repeated across the touch screen to form the display. During fabrication, the metal mesh in the example unit 522 (e.g., corresponding to metal mesh unit 514) can repeat across the touch screen to form a touch screen with uniform optical characteristics. It should be understood that the arrangement of LEDs and the corresponding metal mesh are merely an example, and other arrangements of LEDs and corresponding metal mesh patterns are possible.

Figure 6A:
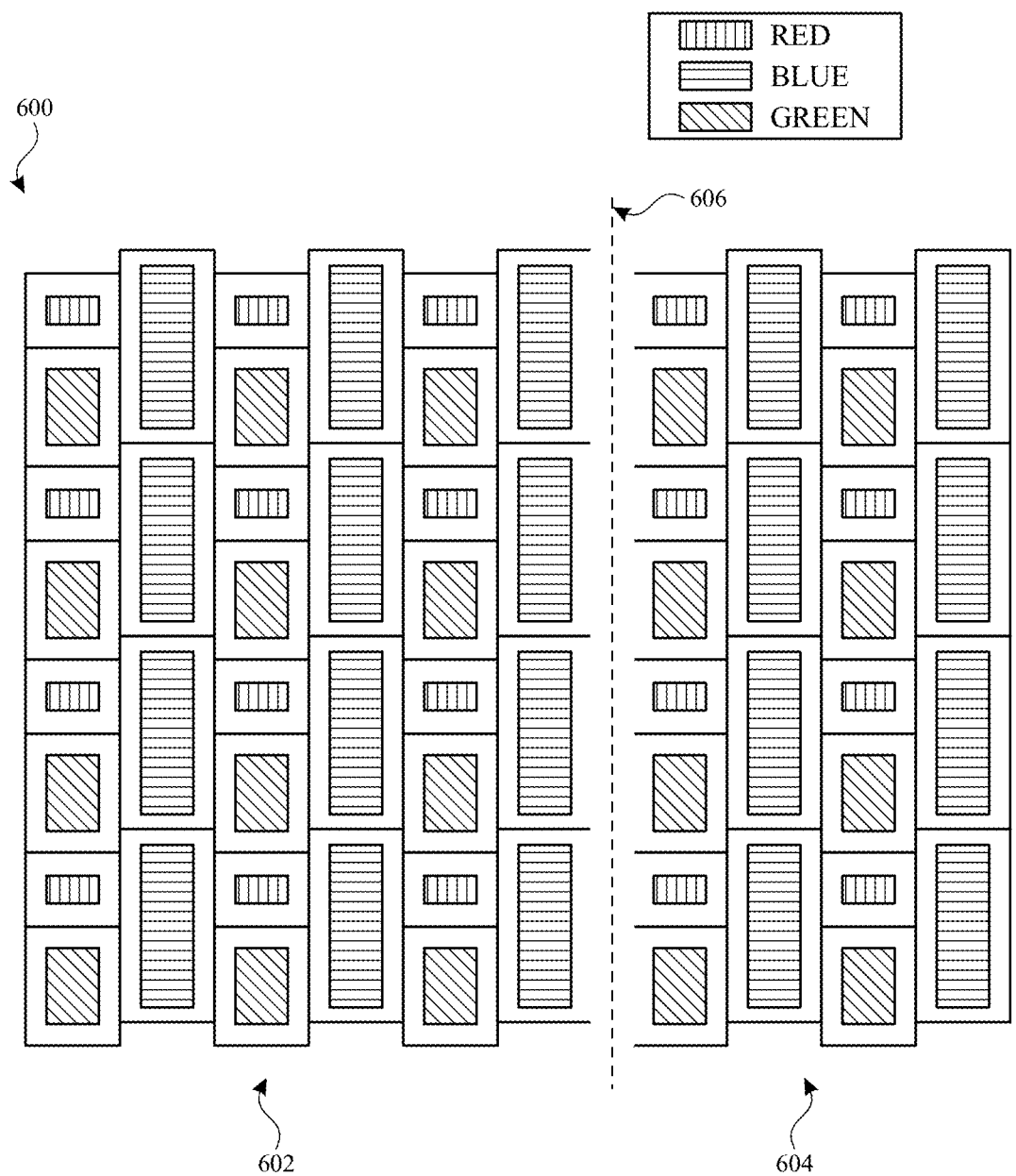
FIGS. 6A-6B illustrate an example cut in metal mesh to separate between two adjacent touch electrodes according to examples of the disclosure.
Figure 6B:
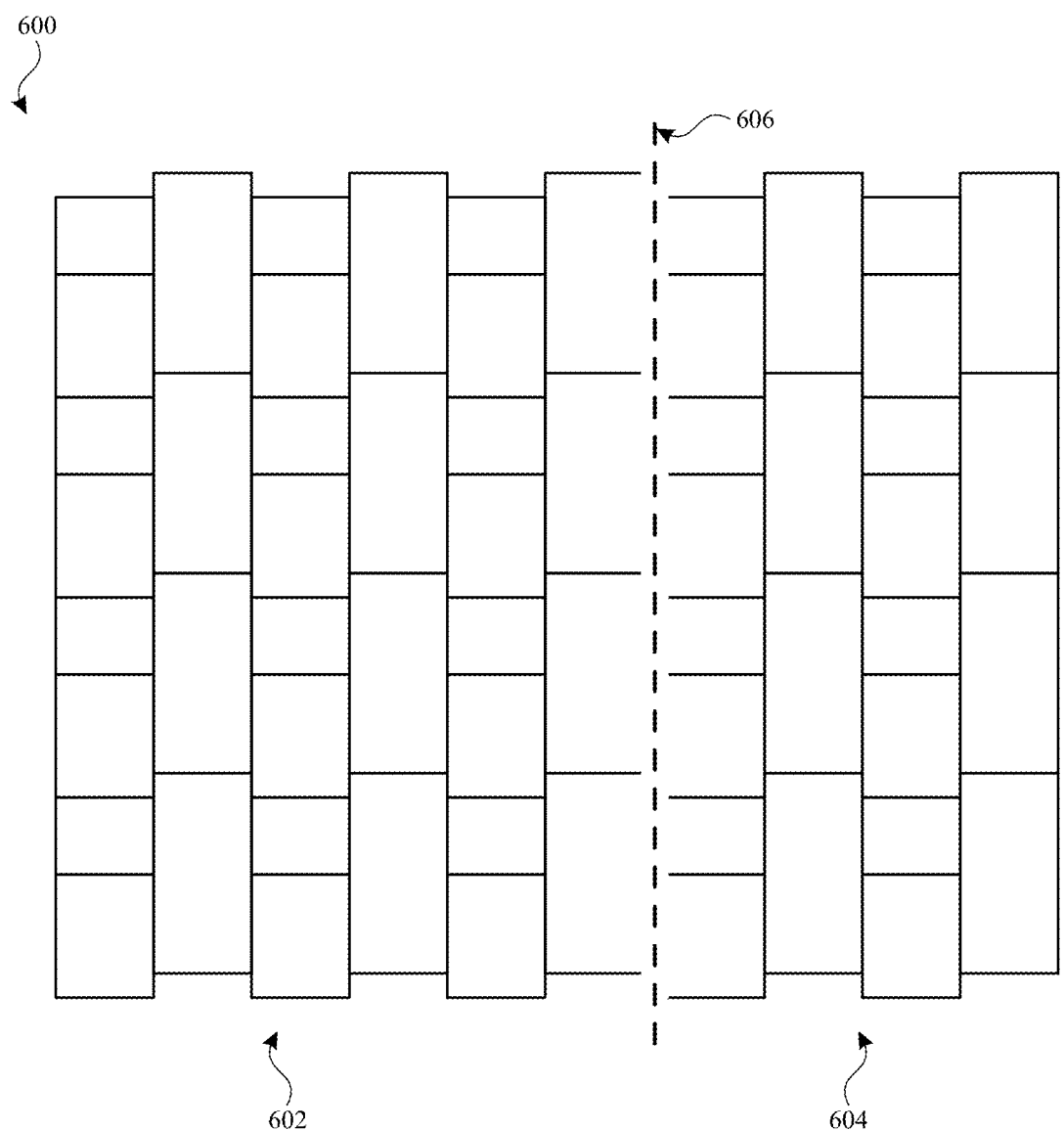

As described herein, the touch electrodes can be formed from the metal mesh. To form the electrically isolated touch electrodes, the metal mesh can be cut (e.g., chemically or laser etched, among other possibilities) to form a boundary between two adjacent touch electrodes (e.g., the boundary defined by the location of the cuts/electrical discontinuities). FIGS. 6A-6B illustrate an example cut in metal mesh to separate between two adjacent touch electrodes according to examples of the disclosure. Section 600 of a touch screen illustrated in FIGS. 6A-6B can correspond to more detailed view of a section of touch screen 410 shown in box 420 in FIG. 4C. Section 600 can include a first portion 602 including metal mesh (and display pixels as shown in FIG. 6A) corresponding to a portion of the touch screen corresponding to touch electrode 424, and a second portion 604 including metal mesh (and display pixels as shown in FIG. 6A) corresponding to a portion of the touch screen corresponding to touch electrode 422. The gap between touch electrode 422 and 424 (exaggerated in FIGS. 6A-6B for illustration purposes) can be formed by cutting the metal mesh between portions 602 and 604 as indicated by the dashed line 606 in FIGS. 6A-6B. The cut in the metal mesh can electrically isolate the metal mesh forming the touch electrode in portion 602 from the metal mesh forming the touch electrode in portion 604. Although FIGS. 6A-6B shows an example cut forming the metal mesh boundary between two touch electrodes (e.g., corresponding to touch electrodes 422 and 424), it is understood that similar, cuts to the metal mesh can be made to form linear boundaries between the remaining touch electrodes (and routing) in the touch sensor panel.

Figure 7A:
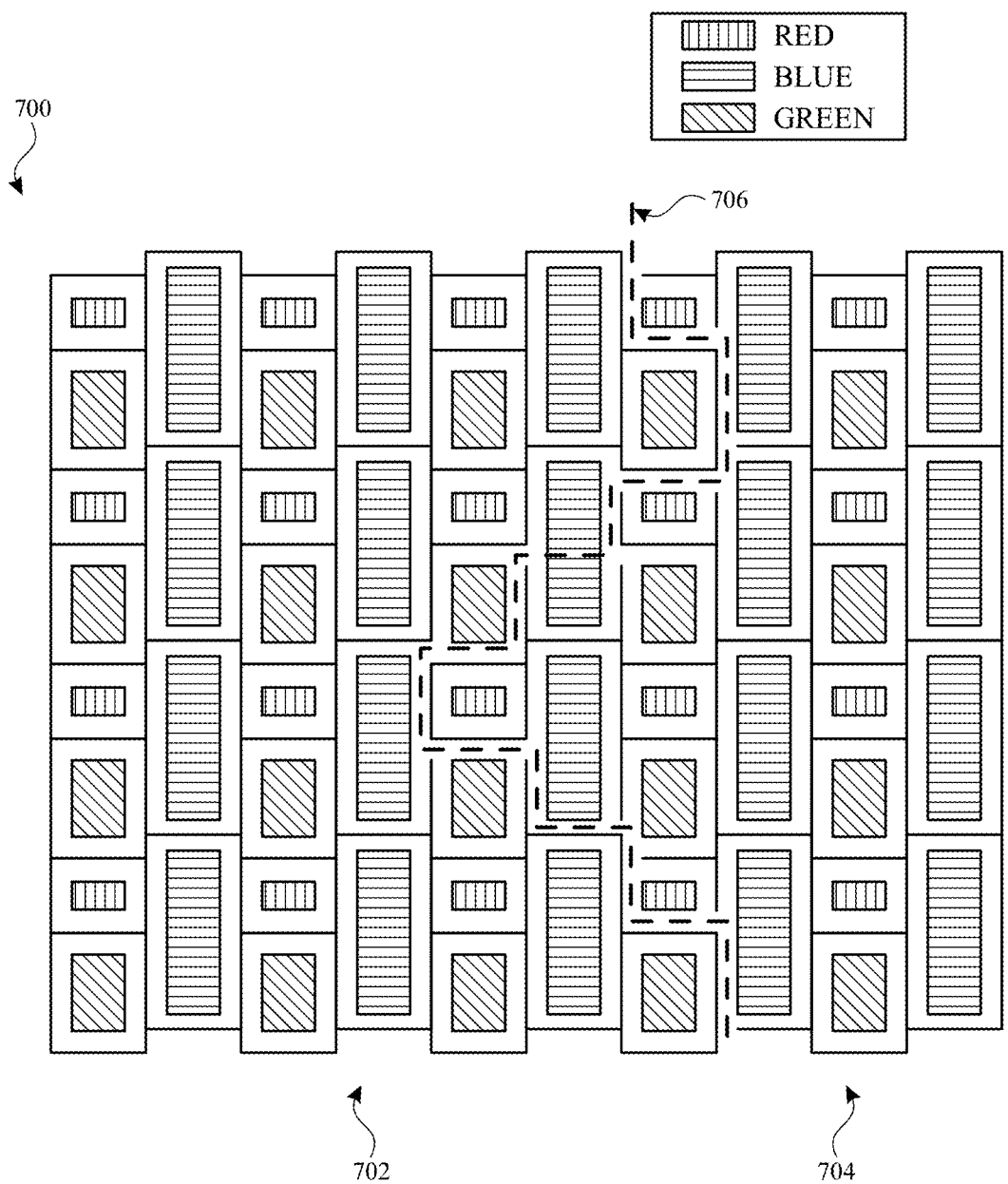
FIGS. 7A-7B illustrate an example non-linear boundary to separate between two adjacent touch electrodes formed of metal mesh according to examples of the disclosure.
Figure 7B:
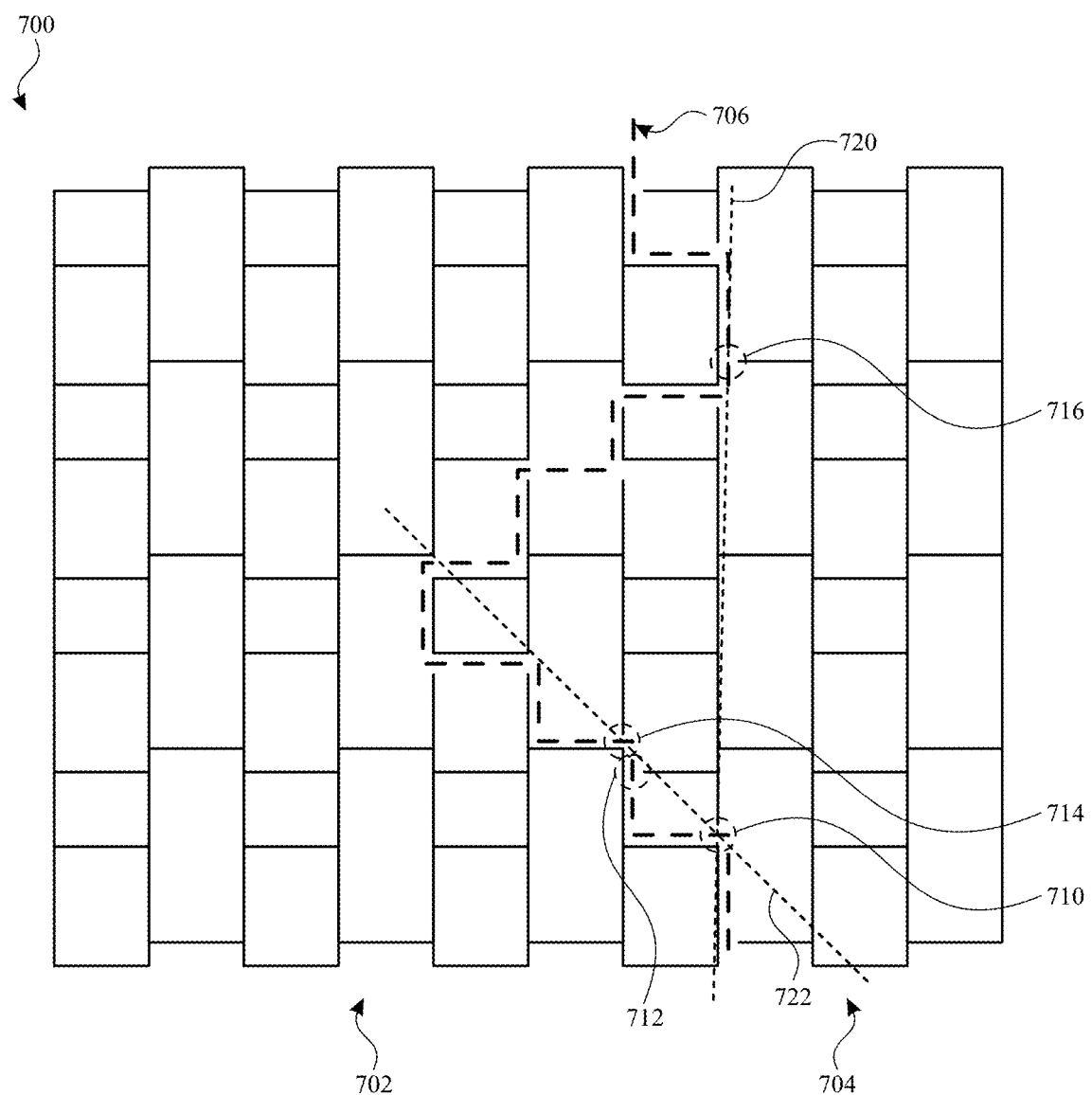

In some examples, to reduce the visibility of the boundaries between the touch electrodes formed from the metal mesh (e.g., while the display is off due to external illumination or while the display is on while certain images are displayed), the non-linear boundaries between touch electrodes can be formed with a non-linear pattern of cuts in the metal mesh. In some examples, the adjacent touch electrodes can be interleaved at the boundary to form a non-linear boundary (e.g., unlike the square/rectangular touch electrodes with a linear boundary illustrated in FIGS. 6A-6B). FIGS. 7A-7B illustrate an example non-linear boundary to separate between two adjacent touch electrodes formed of metal mesh according to examples of the disclosure. Section 700 of a touch screen illustrated in FIGS. 7A-7B can correspond to more detailed view of a section of touch screen at the boundary between two adjacent touch electrodes. Section 700 can include a first portion 702 including metal mesh (and display pixels as shown in FIG. 7A) corresponding to a portion of the touch screen corresponding to a first touch electrode (e.g., touch electrode 424), and a second portion 704 including metal mesh (and display pixels as shown in FIG. 7A) corresponding to a portion of the touch screen corresponding to a second touch electrode (e.g., touch electrode 422). The gap between touch electrodes can be formed by cutting the metal mesh in a non-linear pattern between portions 702 and 704 as indicated by the dashed boundary line 706 in FIGS. 7A-7B.

In some examples, interleaving the boundary can include a stepping of the boundary line between two touch electrodes on the order of every half display or every display pixel (e.g., equal to or less than the maximum length of metal mesh wire corresponding to the length or width of a display pixel). In some examples, for example as illustrated in FIG. 7A-7B, the stepping of the boundary line 706 can occur on the order of every half display pixel. For example, the boundary line can change direction at approximately half the display pixel height or half the display pixel width. For example, cut 710 in the metal mesh (between a blue LED and a red LED), cut 712 in the metal mesh (between a red LED and a green LED), and cut 714 in the metal mesh (between a green LED and a blue LED) can allow boundary line 706 to change directions twice as it traverses each of the display dimensions (once at approximately each half display pixel dimension). Other types of cuts in the metal mesh are possible. For example, cut 716 in the metal mesh (between two blue LEDs). In some examples, the boundary line can step or change directions less frequently or with different frequencies along the boundary. Reducing the linearity of the boundary line can generally reduce the visibility of the boundary between touch electrodes.

Although described above as a non-linear boundary between touch electrodes, the non-linearity may also be expressed in terms of axes. For example, a first axis through a first cut in the metal mesh and through a second cut in the metal mesh at the boundary between two touch electrodes can intersect a second axis through the first cut in the metal mesh and through a third cut in the metal mesh at the same boundary between two touch electrodes. In other words, the first axis and the second axis are not parallel. For example, a first axis 720 through cut 710 and cut 716 in FIG. 7B can intersect a second axis 722 through cut 710 and cut 714, such that the first and second axes 720, 722 can be non-parallel (intersect). In contrast, the cuts illustrated in FIGS. 6A and 6B can all lie on the same axis due to the linear boundary.

Figure 8A:
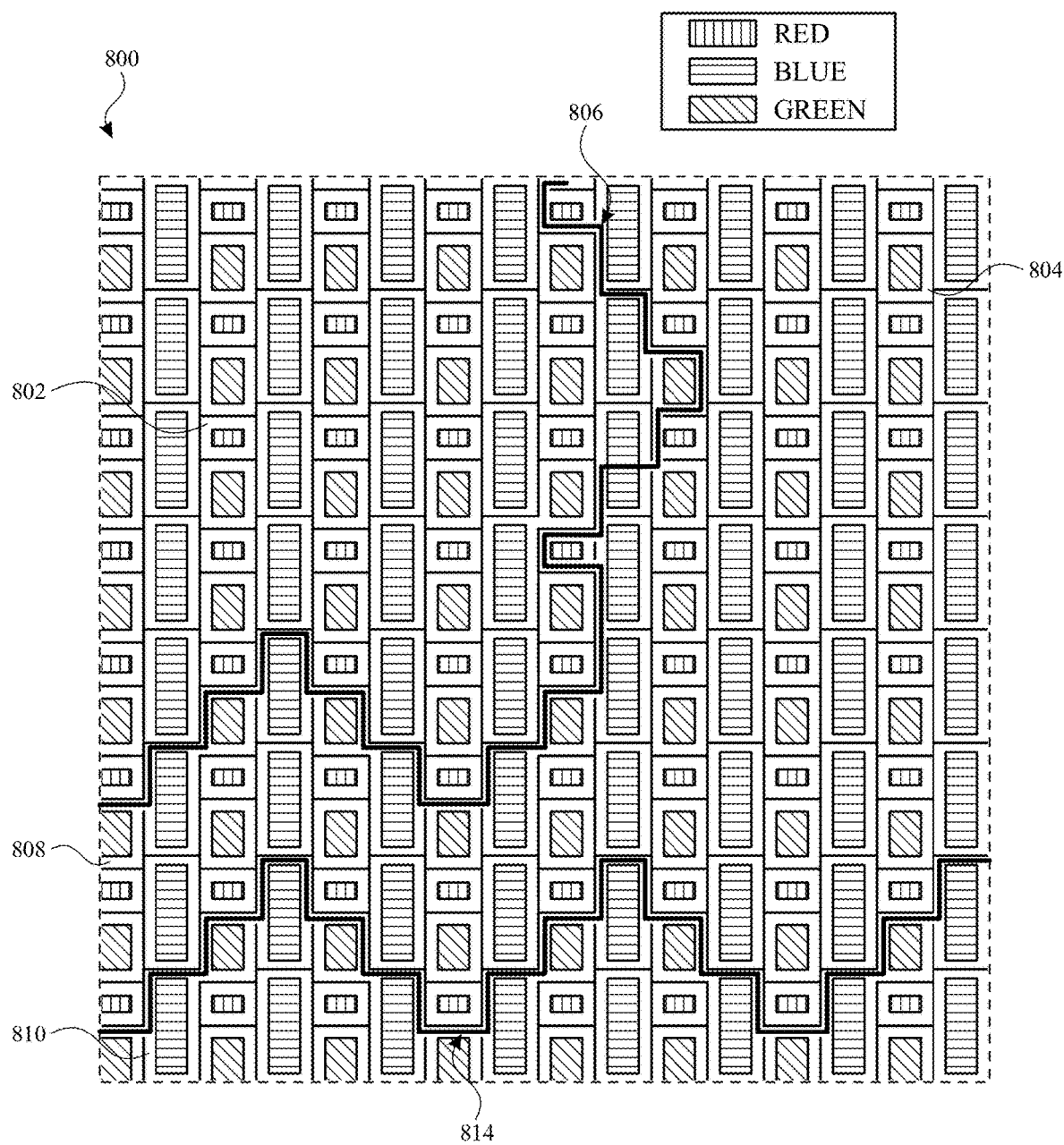
FIGS. 8A-8B illustrate an example non-linear boundary formed by a non-linear pattern of cut in metal mesh to separate between touch electrodes and/or routing according to examples of the disclosure.
Figure 8B:
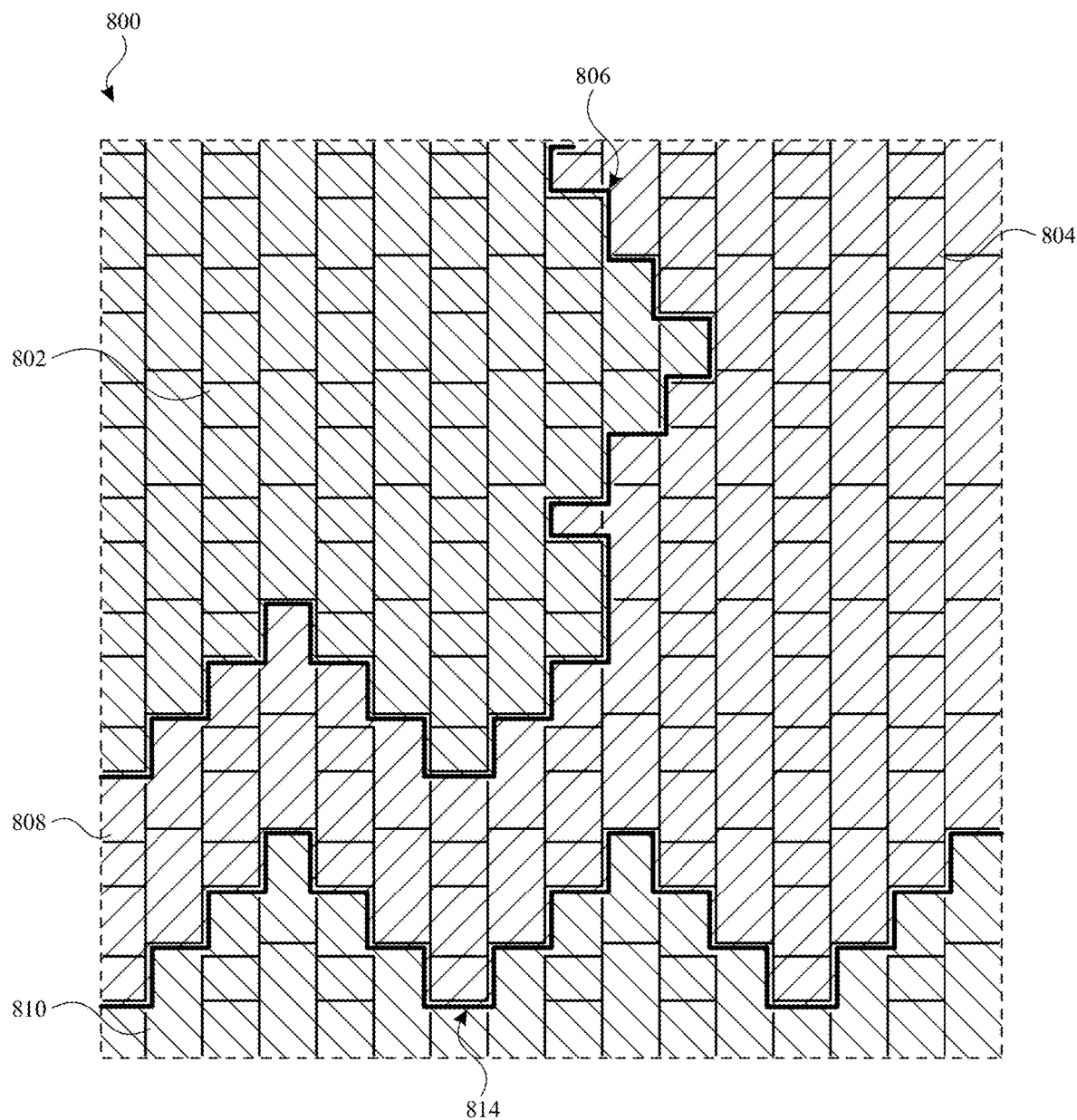

In some examples, to reduce the visibility of the boundaries between a touch electrode and routing of an adjacent touch electrodes (or between routing of two adjacent touch electrodes) formed from the metal mesh (e.g., while the display is off due to external illumination or while the display is on while certain images are displayed), the boundaries between touch electrodes and/or the routing can be formed by a non-linear pattern cuts in the metal mesh (forming a non-linear boundary line). FIGS. 8A-8B illustrate an example non-linear boundary formed by a non-linear pattern of cut in metal mesh to separate between touch electrodes and/or routing according to examples of the disclosure. Section 800 of a touch screen illustrated in FIGS. 8A-8B can correspond to more detailed view of a section of touch screen at the boundary between two adjacent touch electrodes and two adjacent routing traces (e.g., shown in box 432 in FIG. 4C). Section 800 can include a first portion 802 including metal mesh (and display pixels shown in FIG. 8A) corresponding to a portion of the touch screen corresponding to a first touch electrode (e.g., touch electrode 426), a second portion 804 including metal mesh (and display pixels shown in FIG. 8A) corresponding to a portion of the touch screen corresponding to a second touch electrode (e.g., touch electrode 428), a third portion 808 including metal mesh (and display pixels) corresponding to a portion of the touch screen corresponding to routing for the second touch electrode (e.g., routing 428A for touch electrode 428), and a fourth portion 810 including metal mesh (and display pixels) corresponding to a portion of the touch screen corresponding to routing for a third touch electrode (e.g., routing 430A for touch electrode 430). The gap between one touch electrode and an adjacent second touch electrode and its routing can be formed by cutting the metal mesh between portions 802 and 804/808 as indicated by the solid boundary line 806 in FIGS. 8A-8B. The gap between routing of the second touch electrode (and the second touch electrode) and adjacent routing of the third touch electrode can be formed by cutting the metal mesh between portions 804/808 and portion 810 as indicated by the solid boundary line 814 in FIGS. 8A-8B. In some examples, the cuts in the metal mesh used to form the touch electrodes can be similar to the cuts in the metal mesh as described with reference to FIG. 7B (e.g., cut 710 between a blue LED and a red LED, cut 712 between a red LED and a green LED, cut 714 between a green LED and a blue LED, and cut between two blue LEDs).

In some examples, interleaving the boundary between routing and a touch electrode and/or between different routing traces can include a stepping of the boundary line similar to the stepping between two touch electrodes (e.g., on the order of every half display or every display pixel). Reducing the linearity of the boundary lines can generally reduce the visibility of the boundary between routing and a touch electrode and/or between different routing traces.

Although described above as a non-linear boundary between routing and a touch electrode and/or between different routing traces, the non-linearity may also be expressed in terms of axes. For example, a first axis through a first cut in the metal mesh and through a second cut in the metal mesh at the boundary between a routing trace and a touch electrode can intersect a second axis through the first cut in the metal mesh and through a third cut in the metal mesh at the same boundary between the routing trace and the touch electrode. Likewise, a first axis through a first cut in the metal mesh and through a second cut in the metal mesh at the boundary between two routing traces can intersect a second axis through the first cut in the metal mesh and through a third cut in the metal mesh at the same boundary between the routing traces.

Figure 9A:
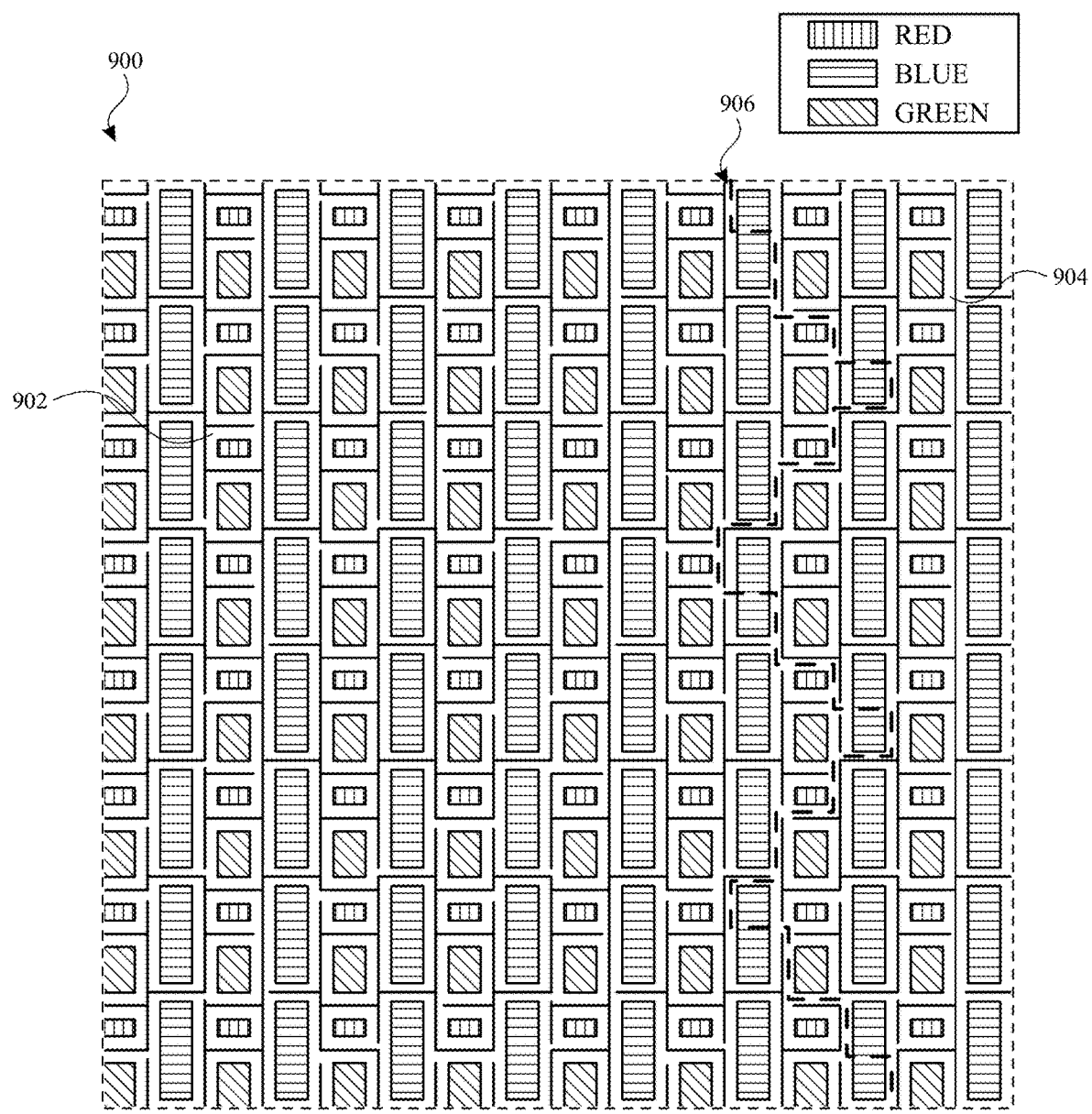
FIGS. 9A-9B illustrate dummy cuts of touch electrode metal mesh according to examples of the disclosure.
Figure 9B:
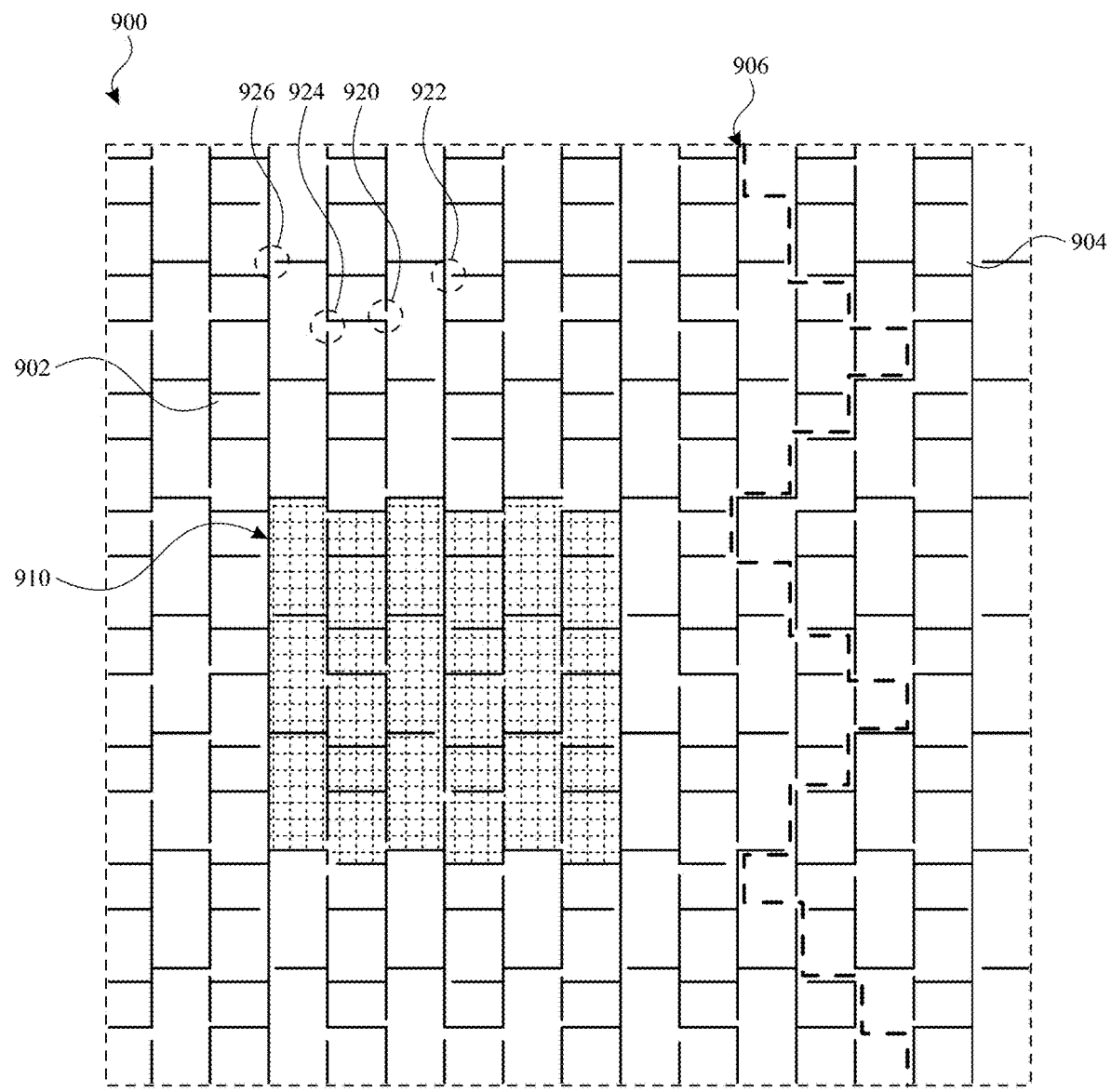

In some examples, the metal mesh of a touch electrode can include dummy cuts to reduce visibility of the metal mesh boundary cuts. A dummy cut can interrupt one electrical path between two portions of the metal mesh (on either side of the dummy cut), without electrically isolating the metal mesh due to one or more other electrical paths between two portions of the metal mesh (on either side of the dummy cut). In other words, the portions of the metal mesh can remain at the same electrical potential despite the internal cuts. FIGS. 9A-9B illustrate dummy cuts of touch electrode metal mesh according to examples of the disclosure. Like FIGS. 7A-7B, FIGS. 9A-9B illustrate an example non-linear boundary line formed by cuts in metal mesh to separate between two adjacent touch electrodes. Section 900 of a touch screen can include a first portion 902 including metal mesh (and display pixels as shown in FIG. 9A) corresponding to a portion of the touch screen corresponding to a first touch electrode (e.g., touch electrode 424), and a second portion 904 including metal mesh (and display pixels as shown in FIG. 9A) corresponding to a portion of the touch screen corresponding to a second touch electrode (e.g., touch electrode 422). The gap between touch electrodes can be formed by cutting the metal mesh between portions 902 and 904 as indicated by the dashed boundary line 906 in FIGS. 9A-9B to electrically separate the two touch electrodes. In addition, the metal mesh forming the touch electrodes in portions 902 and 904 can also include dummy cuts that form physical separations in the metal mesh without electrically separating the metal mesh in portions 902 and 904, respectively.

In some examples, the dummy cuts can mimic the cuts in the metal mesh used to form the boundaries between the touch electrodes (and/or routing). For example, as illustrated in FIG. 7B and described above, the boundaries between the touch electrodes can be formed using four types of cuts (cuts 710, 712, 714 and 716). As illustrated in FIGS. 9A-9B, the dummy cuts can include corresponding types of cuts of the metal mesh. For example, touch electrode corresponding to portion 902 can include cut 920 in the metal mesh between a blue LED and a red LED (e.g., corresponding to cut 710), cut 922 in the metal mesh between a red LED and a green LED (e.g., corresponding to cut 712), cut 924 in the metal mesh between a green LED and a blue LED (e.g., corresponding to cut 714), and cut 926 in the metal mesh between two blue LEDs (e.g., corresponding to cut 716). Although the dummy cuts may mimic the cuts in metal mesh in type, the dummy cuts may not follow the same cut sequence as the sequence used for cutting the boundary between touch electrodes. Indeed, in some examples, strictly following the same cut sequence could result in an electrical isolation of the metal mesh within the touch electrode.

In some examples, the dummy cuts can form a pattern that can be repeated across the touch electrode. For example, a dummy cut unit (e.g., a pattern of discontinuities) can be defined, and the dummy cut unit can be repeated across the touch screen to form the dummy cuts. For example, dummy cut unit 910 in FIGS. 9A-9B (shaded region in FIG. 8B) can define 14 example cuts for a 3×3 display pixel region. The 14 example cuts in dummy cut unit 910 can include two cuts corresponding to cut 716 (blue-blue cut), four cuts corresponding to cut 714 (blue-green cut), four cuts corresponding to cut 710 (red-blue cut), and four cuts corresponding to cut 712 (red-green cut). The pattern in dummy cut unit 910 can be repeated for dummy cuts in other 3×3 display pixel regions. It should be understood that the types of cuts within dummy cut unit 910 and the size of the dummy cut unit 910 in FIGS. 9A-9B are an example, and that other dummy cut units of different size and/or including different numbers or types of cuts can be implemented.

To minimize discontinuities in the repeating dummy cut pattern, in some examples the dummy cut unit can be aligned to the touch electrode edges at or near (within a threshold distance of) the center of the touch screen (e.g., with the right edge of touch electrode 430) and repeat outward to the edges of the touch screen.

The use of dummy cuts within the metal mesh touch electrodes can reduce visibility of the touch electrode boundaries while the display is off or while the display is on. For example, the dummy cuts can reduce the visibility of the boundaries due to a change in perceived texture across the touch screen. The dummy cuts can also mimic the way light from the display is blocked by the metal mesh (or not blocked by cuts) at the boundaries in a similar manner within the touch electrodes to reduce the visibility of the metal mesh and boundaries while the display is on.

In some examples, to reduce the discontinuities in the repeating pattern of the dummy cut unit, the touch electrode size can be designed based on the size of the dummy cut unit. In some examples, the size of the touch electrodes can be an integer multiple of the size of the dummy cut unit. In some examples, the size of the routing can be an integer multiple of the dummy cut unit. Sizing the touch electrodes and/or routing according to the size of the dummy cut unit can reduce discontinuities across the touch screen and thereby reduce visibility of the touch electrode boundaries while the display is off.

Figure 10A:
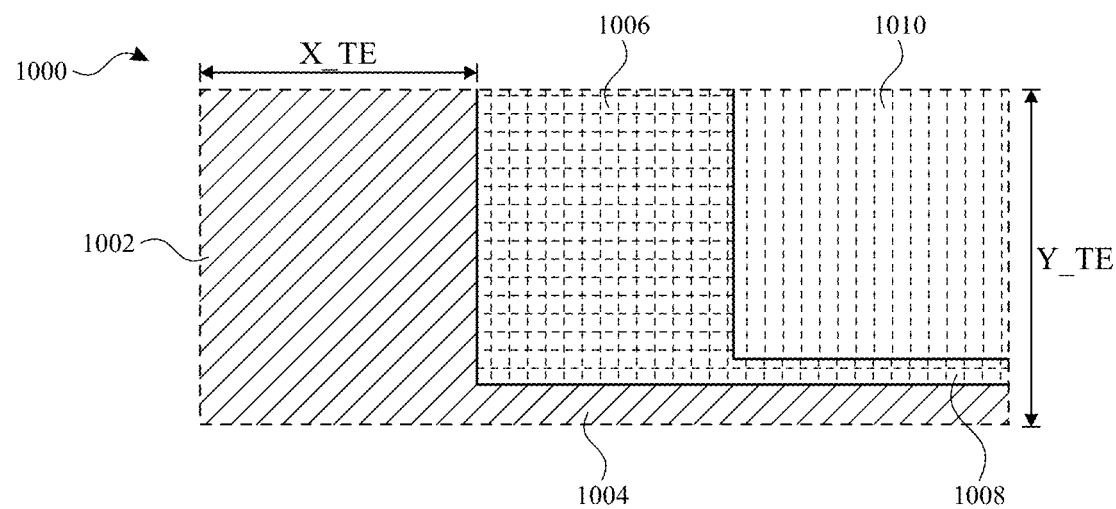
FIGS. 10A-10B illustrate a relationship between the size of the touch electrode and the size of the dummy cut unit according to examples of the disclosure.
Figure 10B:
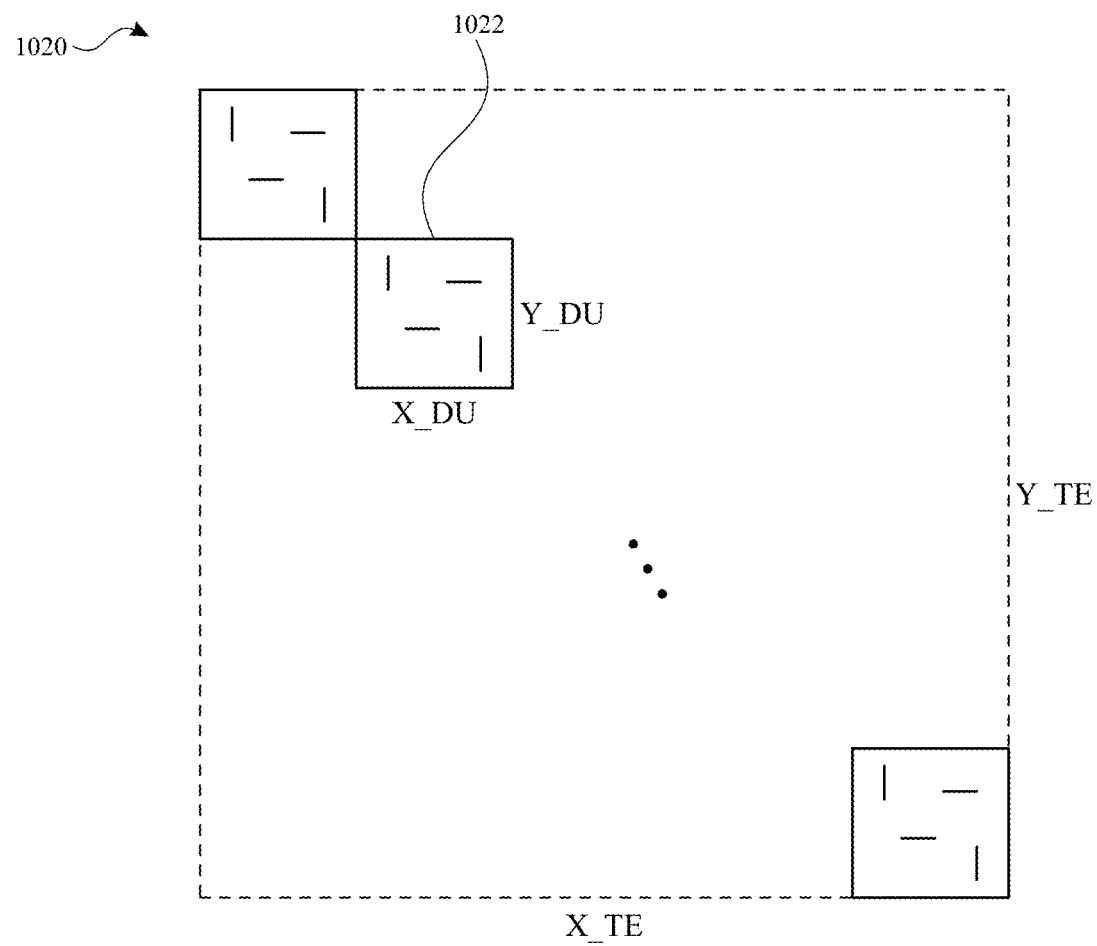

FIGS. 10A-10B illustrate a relationship between the size of the touch electrode and the size of the dummy cut unit according to examples of the disclosure. FIG. 10A illustrates view 1000 corresponding to box 440 in FIG. 4C, that includes three touch electrodes 1002 (and corresponding routing trace 1004), 1006 (and corresponding routing trace 1008) and 1010. Touch electrode 1002 and corresponding routing trace 1004 can correspond to an electrode at the center of the touch screen, and touch electrode 1002 can have width $X_{TE}$ and length $Y_{TE}$, where $X_{TE}$ corresponds to an X-axis dimension for the touch electrode and $Y_{TE}$ corresponds to a Y-axis dimension for touch electrode 1002. As illustrated in FIG. 10B, the dimensions $X_{TE}$ and $Y_{TE}$ can be integer multiples of the dummy cut unit dimensions $X_{DU}$ and $Y_{DU}$, where $X_{DU}$ corresponds to an X-axis dimension for the dummy cut unit and $Y_{DU}$ corresponds to a Y-axis dimension for the dummy cut unit. For example, a dummy cut unit of 3×3 display pixel size (e.g., corresponding to dummy cut unit 910) can result in touch electrode 1002 with a width dimension that is a multiple of three display pixel widths and a length dimension that is a multiple of three display pixel lengths. The sizing for the other touch electrodes (e.g., touch electrodes 1006 and 1010) can follow from the sizing center-most touch electrode (e.g., touch electrode 1002), accounting for some loss in Y-axis dimension due to one or more routing traces (e.g., due to routing traces 1004 and/or 1008).

In some examples, the size of the routing can be an integer multiple of the dummy cut unit. For example, the length in the Y-axis dimension of routing 1004 and/or of routing 1008 can be an integer multiple of the dummy cut unit. In some examples, to minimize the routing size, the length in the Y-axis dimension of routing 1004 and of routing 1008 can be the same length as one dummy cut unit (i.e., an integer multiple of 1).

In some examples, even without routing dimensions being an integer multiple of the dummy cut unit, the discontinuities can be reduced (and the visibility of the metal mesh reduced) for the overall touch screen when the discontinuity repeats for each row of touch electrodes. For example, the dimensions for touch electrodes and routing in each row of touch electrodes in touch screen 410 can be the same such that the discontinuities repeat for each row (e.g., at the routing traces 1004 and/or 1008 and/or at touch electrode 1010).

In some examples, the location of metal mesh cuts at the touch electrode and/or routing boundaries or within the touch electrodes and/or routing for dummy cuts can be optimized to reduce visibility of the metal mesh. In some examples, the location of the cuts can correspond to locations of minimum (or relatively low) light intensity from the display. By placing the cuts in locations with minimum light intensity allows for emitted light from the location of the cut to be most similar between the on-state and off-state of the display.

Figure 11A:
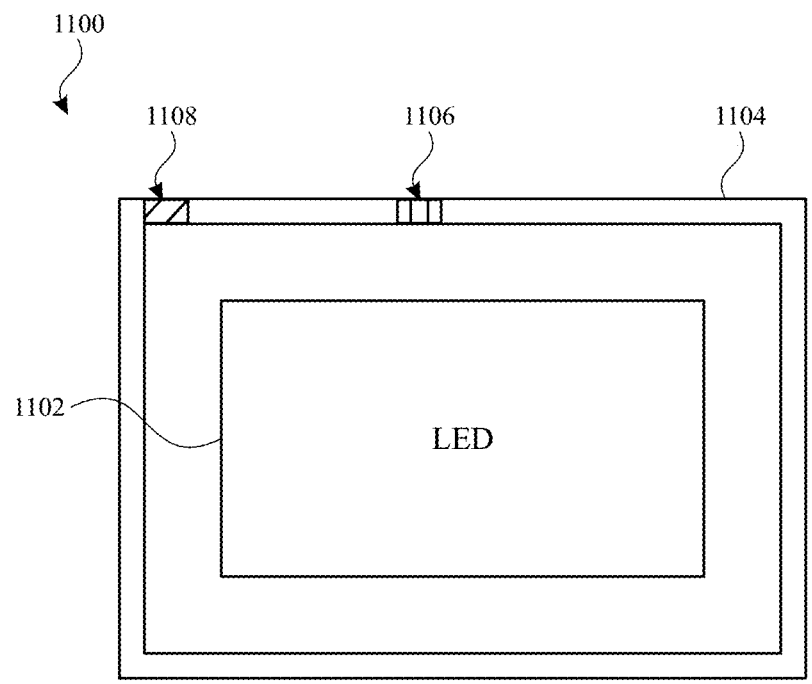
FIGS. 11A and 11B illustrate an example LED and an example metal mesh around the example LED according to examples of the disclosure.
Figure 11B:
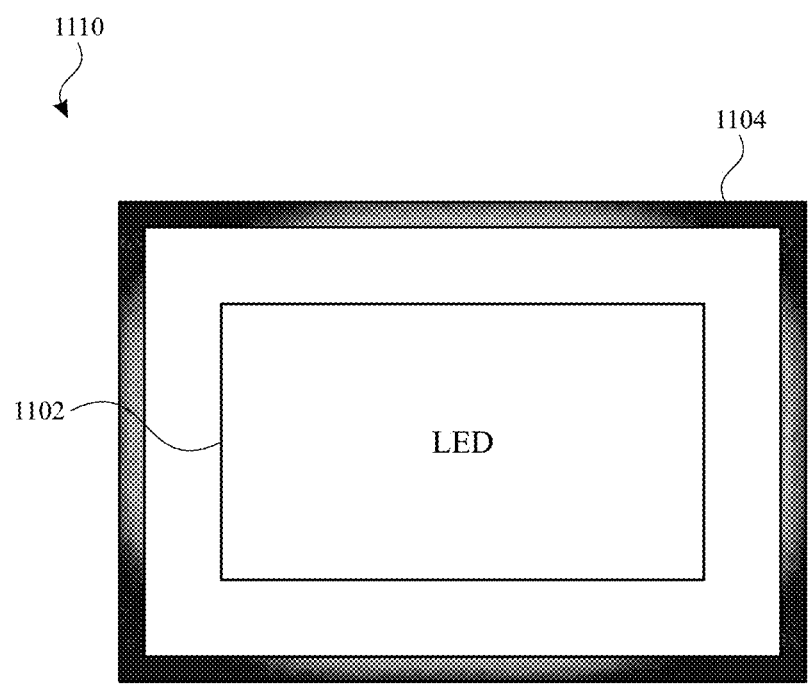

FIGS. 11A and 11B illustrate an example LED 1102 and an example metal mesh 1104 around LED 1102 according to examples of the disclosure. FIG. 11A shows view 1100 with different example cuts 1106 and 1108 in metal mesh 1104. FIG. 11B shows view 1110 with an example heat map of the intensity of emitted light from LED 1102 at locations corresponding to metal mesh 1104 (but that would be occluded by metal mesh 1104 during operation). The heat map in grey scale with the black end of the scale representing minimum light intensity and the white end of the scale representing maximum light intensity. The intensity of emitted light at the locations corresponding to metal mesh 1104 may not be uniform. For example, as illustrated in FIG. 11B, the intensity of emitted light can decrease as the distance increases from LED 1102. Additionally, as illustrated in FIG. 11B, the intensity may be higher along the sides of LED 1102 than at the corners of LED 1102. By cutting metal mesh 1104 as shown by cut 1108 in FIG. 11A at a location near the corner of metal mesh 1104 (e.g., greater than a threshold distance from a line bisecting LED 1102, or less than a threshold distance from the intersection of two metal mesh wires), the light emitted at that location while LED 1102 is on may be similar or the same as the light emitted at that location while LED 1102 is off. In contrast, by cutting metal mesh 1104 as shown by cut 1106 in FIG. 11A at a location near the center of a side of metal mesh 1104, the light emitted at that location while LED 1102 is on may be greater due to cut 1106 than the light emitted at that location while LED 1102 is off. As a result, the metal mesh (and cut) visibility while the display is on can be reduced relatively by cutting metal mesh 1104 at or near (within a threshold distance of) a location corresponding to minimum (or lower) light intensity (e.g., cut 1008) compared with cutting metal mesh 1104 at a location with relatively greater light intensity (e.g., cut 1106). Thus, intensity maps (determined empirically by measurement) of the display pixels and metal mesh can be used to determine the location of the dummy or real cuts described herein.

In some examples, in addition to or as an alternate for dummy cuts, the metal mesh can be notched to mimic the optical impact of a dummy cut without causing a localized break in the electrical conduction path of the metal mesh within the touch electrodes. As described above, cuts in the metal mesh (dummy cuts or boundary cuts) can result in different levels of light occlusion at display pixels across the touch screen, which can increase visibility of the metal mesh and/or cuts in the metal mesh. In some examples, the notches can mitigate (reduce or eliminate) the non-uniform occlusion levels across the touch screen. One advantage of notches over dummy cuts can be that the notches may allow for maintaining electrical conductivity of the metal mesh which can provide design flexibility in the touch electrodes while maintaining the electrical connection between all portions of the metal mesh forming a respective touch electrode. In contrast, placement of dummy cuts may require more attention because some dummy cut patterns could result in islands of metal mesh within the touch electrode region that may be electrically isolated from the remaining metal mesh within the touch electrode region.

Figure 12A:
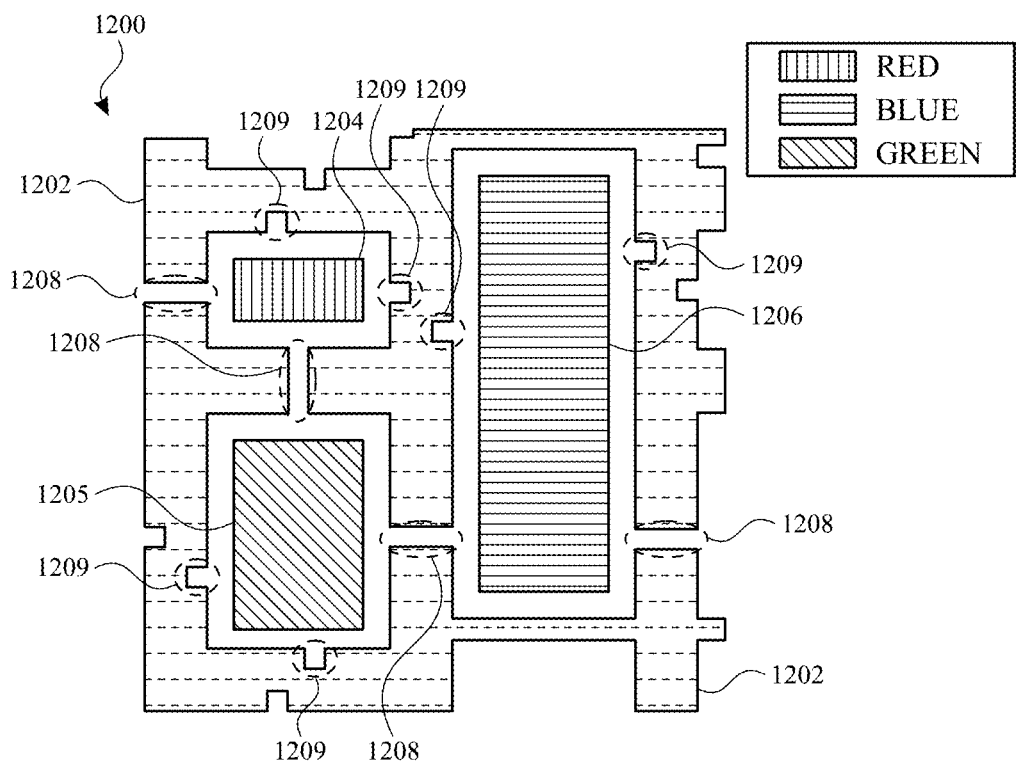
FIGS. 12A-12B illustrate example notches in metal mesh according to examples of the disclosure.
Figure 12B:
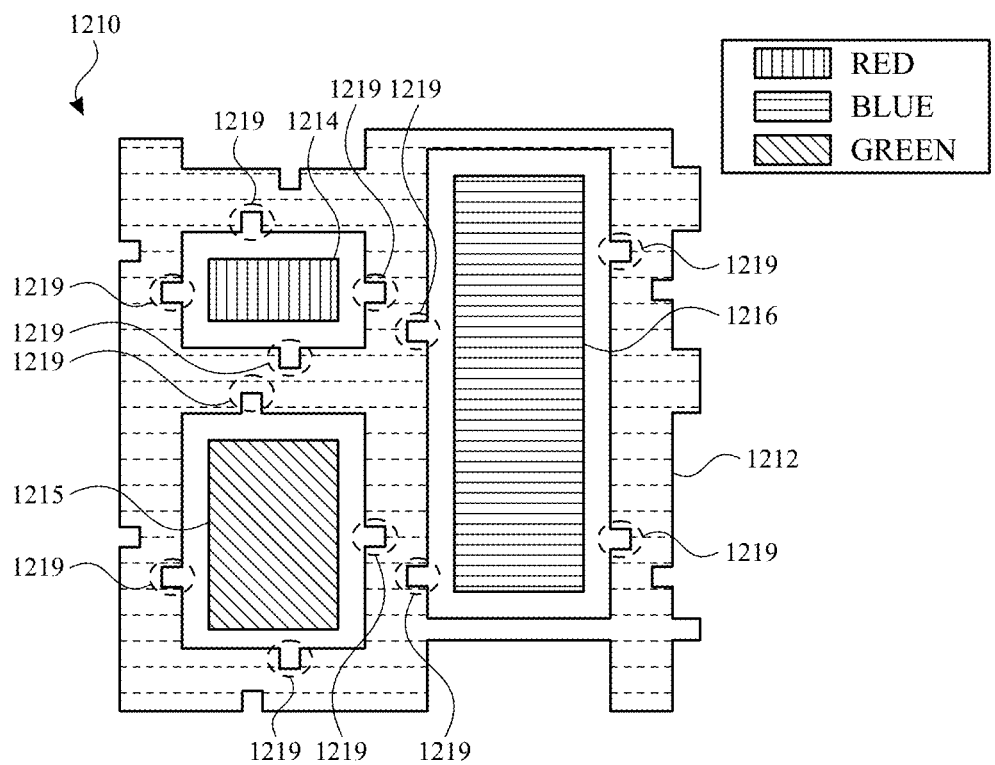

FIGS. 12A-12B illustrate example notches in metal mesh according to examples of the disclosure. FIG. 12A illustrates an example touch screen unit 1200 (e.g., corresponding to unit 522) including an RGB display pixel (including a red LED 1204, green LED 1205 and blue LED 1206) and surrounding metal mesh 1202. Cuts 1208 can be made in metal mesh 1202 as described herein. Additionally, notches 1209 can be made in metal mesh 1202. For example, FIG. 12A illustrates two notches 1209 and two cuts 1208 in metal mesh 1202 for each of the corresponding LEDs of the display pixel. The notches can include a notch in a first metal mesh wire of the metal mesh adjacent to a red LED (e.g., on the side of the metal mesh wire adjacent to the red LED), a notch in a second metal mesh wire of the metal mesh adjacent to a green LED (e.g., on the side of the metal mesh wire adjacent to the green LED), and/or a notch in a third metal mesh wire of the metal mesh adjacent to a blue LED (e.g., on the side of the metal mesh wire adjacent to the blue LED). FIG. 12B illustrates an example touch screen unit 1210 (e.g., corresponding to unit 522) including an RGB display pixel (including a red LED 1214, green LED 1215 and blue LED 1216) and surrounding metal mesh 1212 (without cuts in the metal mesh). Notches 1209 can be made in metal mesh 1212. For example, FIG. 12B illustrates four notches 1219 in metal mesh 1212 for each of the corresponding LEDs of the display pixel.

Additionally, as shown in FIGS. 12A and 12B, in some examples, the notches in the metal mesh between to LEDs can include a pair of notches on opposite sides of the metal mesh. For example, two notches 1219 can be made in the metal mesh between green LED 1215 and blue LED 1216. The first notch can be made on the side of the metal mesh wire adjacent to green LED 1215 and the second notch can be made on the opposite side of the metal mesh wire adjacent to blue LED 1216. In some examples, the notches on opposite sides of the metal mesh wire can be offset as shown in FIG. 12B with the notch on the first side of the metal mesh wire adjacent to green LED 1215 offset along the vertical axis from the notch on the second, opposite side of the metal mesh wire adjacent to blue LED 1216.

It should be understood that the number of notches and/or cuts can be four per LED as illustrated in FIGS. 12A-12B, but in other examples, the number of notches or cuts can be different for different display pixel/mesh units (e.g., one display pixel can include four cuts and four notches in its corresponding metal mesh and a second display pixel can include two cuts and six notches in its corresponding metal mesh) or can be different among the LEDs in a display pixel (e.g., four notches/cuts in the metal mesh corresponding to a blue LED, three notches/cuts in the metal mesh corresponding to the red and/or green LED).

In some examples, the sum of the number of notches and the number of cuts for each of the LEDs in a display pixel can be the same. In some examples, the sum of the number of notches and the number of cuts for each of the display pixels can be the same. Uniformity of light occlusion by the metal mesh can be improved by using notches. For example, as described above, boundary cuts and/or dummy cuts can result in some display pixels having different numbers of cuts and/or different LEDs have different number of cuts across the display. Because of the different number of cuts in the metal mesh around different LEDs, the light occluded by the mesh can be different within a display pixel or across display pixels. The notches can provide for more uniform occlusion with necessitating additional cuts which may impact the electrical connectivity of the metal mesh within the touch electrode regions.

Although illustrated in FIGS. 12A-12B as rectangular notches in rectangular metal mesh, it should be understood that the notches and the metal mesh can have other shapes (e.g., round or triangular notches, diamond or hexagonal shaped metal mesh, etc.). Additionally, in some examples, the notches can be placed at or near (within a threshold distance of) locations with minimum light intensity in a similar manner as described herein for cuts.

Figure 13:
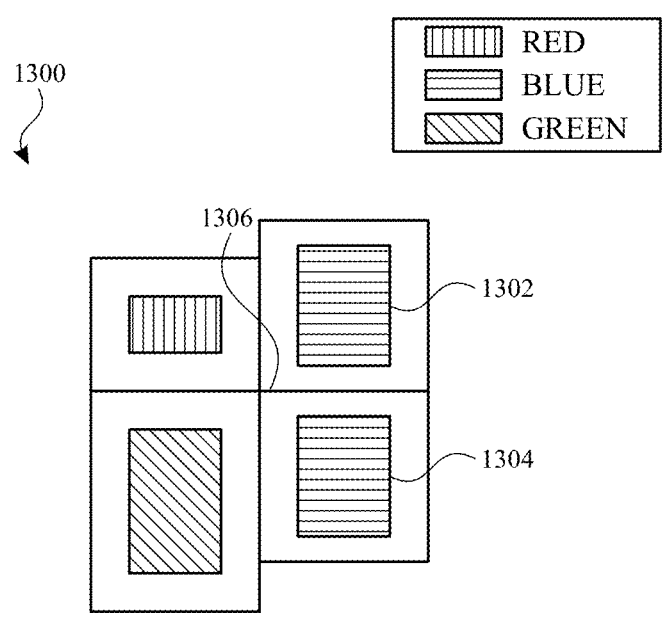
FIG. 13 illustrates an example unit of a display pixel and corresponding metal mesh according to examples of the disclosure.

In some examples, to provide additional flexibility for cutting the metal mesh for boundary cuts or for dummy cuts, the blue LED in a display pixel can be replaced by two smaller blue LEDs. Additional metal mesh can pass between the two blue LEDs. FIG. 13 illustrates an example unit 1300 of a display pixel and corresponding metal mesh according to examples of the disclosure. The display pixel can include two blue LEDs 1302 and 1304, one red LED and one green LED. Splitting the blue LED can allow for metal mesh 1306 to pass between the blue LEDs, and provides another path for establishing electrical conductivity in the metal mesh and/or another metal mesh location for establishing a cut (e.g., a cut between a first blue LED and a second blue LED within a display pixel) or a notch as described herein. In some examples, the two blue LEDs in a display pixel can be independent, and can be driven by separate thin film transistors (e.g., such that the four-LED touch pixel can be controlled with four LED driving circuits based in the TFT layer). In some examples, the two blue LEDs can be driven by shared thin film transistors (e.g., such that the four-LED touch pixel can be controlled with three LED driving circuits based in the TFT layer).

Although the visibility mitigations described herein may be illustrated and described separately, it is understood that some or all of the mitigations can be used in combination. For example, non-linear boundary cuts between touch electrodes (e.g., described with reference to FIGS. 7A-7B), non-linear boundary cuts between touch electrodes and routing or between routing and other routing (e.g., described with reference to FIGS. 8A-8B), dummy cuts within the touch electrode regions (e.g., described with reference to FIGS. 9A-9B), touch electrode and/or routing sizing with respect to dummy cut units (e.g. described with reference to FIGS. 10A-10B), placement of cuts within the metal mesh (e.g., described with reference to FIGS. 11A-11B), notch cuts (e.g., described with reference to FIGS. 12A-12B), and splitting of the blue LED (e.g., described with reference to FIG. 13) can be implemented together in one touch screen including metal mesh touch electrodes. In some examples, a subset of the above visibility mitigations may be used in combination in a touch screen. In some examples, only one of the visibility mitigations may be used in a touch screen.

Therefore, according to the above, some examples of the disclosure are directed to a touch screen. The touch screen can comprise display pixels disposed in a first layer and touch electrodes formed of metal mesh disposed in a second layer. Electrical discontinuities in the metal mesh can form a first boundary between a first of the touch electrodes and a second of the touch electrodes. The first of the touch electrodes can be adjacent to the second of the touch electrodes. A first axis through a location of a first of the electrical discontinuities forming the first boundary and through a location of a second of the electrical discontinuities forming the first boundary can intersect a second axis through the location of the first of the electrical discontinuities forming the first boundary and through a location of a third of the electrical discontinuities forming the first boundary. Additionally or alternatively to one or more of the examples disclosed above, in some examples, a distance between adjacent electrical discontinuities of the electrical discontinuities in the metal mesh forming the first boundary can be less than a maximum length of metal mesh wire corresponding to one dimension of one display pixel of the display pixels. Additionally or alternatively to one or more of the examples disclosed above, in some examples, the display pixels can include a plurality of light emitting diodes. The plurality of light emitting diodes can be disposed in the first layer opposite openings in the metal mesh disposed in the second layer. Additionally or alternatively to one or more of the examples disclosed above, in some examples, the electrical discontinuities forming the first boundary can comprise: an electrical discontinuity in the metal mesh between a red light emitting diode and a green light emitting diode; an electrical discontinuity in the metal mesh between the red light emitting diode and a blue light emitting diode; an electrical discontinuity in the metal mesh between the green light emitting diode and the blue light emitting diode; or an electrical discontinuity in the metal mesh between the blue light emitting diode and another blue light emitting diode. Additionally or alternatively to one or more of the examples disclosed above, in some examples, the electrical discontinuities in the metal mesh forming the first boundary can comprise: an electrical discontinuity in the metal mesh between a red light emitting diode and a green light emitting diode; an electrical discontinuity in the metal mesh between the red light emitting diode and a blue light emitting diode; an electrical discontinuity in the metal mesh between the green light emitting diode and the blue light emitting diode; and an electrical discontinuity in the metal mesh between the blue light emitting diode and another blue light emitting diode. Additionally or alternatively to one or more of the examples disclosed above, in some examples, the touch screen can further comprise a first routing trace corresponding to the first of the touch electrodes, the first routing trace adjacent to the second of the touch electrodes. Electrical discontinuities in the metal mesh can form a second boundary between the first routing trace and the second of the touch electrodes. A first axis through a location of a first of the electrical discontinuities forming the second boundary and through a location of a second of the electrical discontinuities forming the second boundary can intersect a second axis through the location of the first of the electrical discontinuities forming the second boundary and through a location of a third of the electrical discontinuities forming the second boundary. Additionally or alternatively to one or more of the examples disclosed above, in some examples, the touch screen can further comprise routing traces corresponding to one or more of the touch electrodes including a first routing trace corresponding to the first of the touch electrodes and a second routing trace corresponding to a third electrode of the touch electrodes. The first routing trace can be adjacent to the second routing trace. Electrical discontinuities in the metal mesh can form a third boundary between the first routing trace and the second routing trace. A first axis through a location of a first of the electrical discontinuities forming the third boundary and through a location of a second of the electrical discontinuities forming the third boundary can intersect a second axis through the location of the first of the electrical discontinuities forming the third boundary and through a location of a third of the electrical discontinuities forming the third boundary. Additionally or alternatively to one or more of the examples disclosed above, in some examples, the metal mesh of the first of the touch electrodes can be at a same electrical potential, and the metal mesh of the first of the touch electrodes can include electrical discontinuities internal to an area of the first of the touch electrodes. Additionally or alternatively to one or more of the examples disclosed above, in some examples, the electrical discontinuities internal to the area of the first of the touch electrodes can correspond to the electrical discontinuities in the metal mesh forming the first boundary. Additionally or alternatively to one or more of the examples disclosed above, in some examples, a subset of the electrical discontinuities internal to the area of the first of the touch electrodes corresponding to a sub-region of the area of the first of the touch electrodes can form a pattern of discontinuities, and the pattern of discontinuities can repeat for addition sub-regions of the area of the first of the touch electrodes. Additionally or alternatively to one or more of the examples disclosed above, in some examples, the pattern of discontinuities can repeat for an area of the second of the touch electrodes and for an area of a third of the touch electrodes. Additionally or alternatively to one or more of the examples disclosed above, in some examples, a first dimension of the area of the first of the touch electrodes can be an integer multiple of a first dimension of the sub-region. A second dimension of the area of the first of the touch electrodes can be an integer multiple of a second dimension of the sub-region. Additionally or alternatively to one or more of the examples disclosed above, in some examples, the first of the touch electrodes can be within a threshold distance of a center of the touch screen. Additionally or alternatively to one or more of the examples disclosed above, in some examples, the integer multiple of the first dimension of the sub-region and the integer multiple of the second dimension of the sub-region can both be greater than one. Additionally or alternatively to one or more of the examples disclosed above, in some examples, the touch screen can further comprise a first routing trace corresponding to the first of the touch electrodes. A first dimension of the routing trace can be an integer multiple of a first dimension of the sub-region. Additionally or alternatively to one or more of the examples disclosed above, in some examples, the integer multiple of the first dimension of the sub-region can be one. Additionally or alternatively to one or more of the examples disclosed above, in some examples, the metal mesh of the first of the touch electrodes can comprise one or more notches in one or more metal mesh wires. Additionally or alternatively to one or more of the examples disclosed above, in some examples, the one or more notches in the one or more metal mesh wires can comprise a first notch in a first metal mesh wire on a side of the first metal mesh wire adjacent to a red light emitting diode. Additionally or alternatively to one or more of the examples disclosed above, in some examples, the one or more notches in the one or more metal mesh wires can comprise a first notch in a first metal mesh wire on a side of the first metal mesh wire adjacent to a blue light emitting diode. Additionally or alternatively to one or more of the examples disclosed above, in some examples, the one or more notches in the one or more metal mesh wires can comprise a first notch in a first metal mesh wire on a side of the first metal mesh wire adjacent to a green light emitting diode. Additionally or alternatively to one or more of the examples disclosed above, in some examples, a sum of a number of notches and a number of electrical discontinuities in metal mesh wires corresponding to each light emitting diode of a display pixel of the display pixels can be equal. Additionally or alternatively to one or more of the examples disclosed above, in some examples, a sum of a number of notches and a number of electrical discontinuities in metal mesh wires corresponding to each display pixel of the display pixels can be equal. Additionally or alternatively to one or more of the examples disclosed above, in some examples, a first metal mesh wire can comprise a first notch on a first side of the first metal mesh wire and a second notch on a second side, opposite the first side, of the first metal mesh wire. Additionally or alternatively to one or more of the examples disclosed above, in some examples, the first notch on the first side and the second notch on the second side can be offset. Additionally or alternatively to one or more of the examples disclosed above, in some examples, the one or more notches can be located within a threshold distance of one or more intersections between metal mesh wires. Additionally or alternatively to one or more of the examples disclosed above, in some examples, the one or more notches can be located at or within a threshold distance of a minimum light intensity emitted from a light emitting diode for the metal mesh wires adjacent to the light emitting diode. Additionally or alternatively to one or more of the examples disclosed above, in some examples, one or more of the electrical discontinuities in the metal mesh forming the first boundary or one or more of electrical discontinuities internal to an area of the first touch electrode can be located within a threshold distance of one or more intersections between metal mesh wires. Additionally or alternatively to one or more of the examples disclosed above, in some examples, the electrical discontinuities in the metal mesh forming the first boundary or the one or more of the electrical discontinuities internal to the area of the first touch electrode can be located at or within a threshold distance of a minimum light intensity emitted from a light emitting diode for the metal mesh wires adjacent to the light emitting diode. Additionally or alternatively to one or more of the examples disclosed above, in some examples, the display pixels can comprise at least one display pixel including a red light emitting diode, a green light emitting diode, a first blue light emitting diode and a second blue light emitting diode.

A metal mesh wire can be disposed between the first blue light emitting diode and the second blue light emitting diode. Additionally or alternatively to one or more of the examples disclosed above, in some examples, the electrical discontinuities in the metal mesh forming the first boundary of the first touch electrode or electrical discontinuities internal to the area of the first touch electrode can include an electrical discontinuity in the metal mesh wire disposed between the first blue light emitting diode and the second blue light emitting diode.

Some examples of the disclosure are directed to a touch screen. The touch screen can comprise: a plurality of display pixels disposed in a first layer; and a plurality of touch electrodes formed of metal mesh disposed in a second layer, the plurality of touch electrodes comprising a first touch electrode and a second touch electrode adjacent to the first touch electrode. Positions of a plurality of first electrical discontinuities in the metal mesh can define a first boundary between the first touch electrode and the second touch electrode. The plurality of first electrical discontinuities can comprise a first electrical discontinuity, a second electrical discontinuity, and a third electrical discontinuity defined by different regions of the metal mesh layer. A first axis through locations of the first electrical discontinuity and the second electrical discontinuity can intersect a second axis through locations of the first electrical discontinuity and the third electrical discontinuity (non-parallel axes). Additionally or alternatively to one or more of the examples disclosed above, in some examples, a distance between adjacent electrical discontinuities of the electrical discontinuities in the metal mesh defining the first boundary can be less than a length of a dimension of a display pixel of the plurality of display pixels. Additionally or alternatively to one or more of the examples disclosed above, in some examples, the plurality of display pixels can include a plurality of light emitting diodes disposed in the first layer opposite openings in the metal mesh disposed in the second layer. Additionally or alternatively to one or more of the examples disclosed above, in some examples, the plurality of first electrical discontinuities defining the first boundary can comprise: an electrical discontinuity in the metal mesh between a red light emitting diode and a green light emitting diode; an electrical discontinuity in the metal mesh between the red light emitting diode and a blue light emitting diode; an electrical discontinuity in the metal mesh between the green light emitting diode and the blue light emitting diode; or an electrical discontinuity in the metal mesh between the blue light emitting diode and another blue light emitting diode. Additionally or alternatively to one or more of the examples disclosed above, in some examples, the plurality of first electrical discontinuities in the metal mesh defining the first boundary can comprise: an electrical discontinuity in the metal mesh between a red light emitting diode and a green light emitting diode; an electrical discontinuity in the metal mesh between the red light emitting diode and a blue light emitting diode; an electrical discontinuity in the metal mesh between the green light emitting diode and the blue light emitting diode; and an electrical discontinuity in the metal mesh between the blue light emitting diode and another blue light emitting diode. Additionally or alternatively to one or more of the examples disclosed above, in some examples, the touch screen can further comprise a first routing trace corresponding to the first touch electrode, the first routing trace adjacent to the second touch electrode. Positions of a plurality of second electrical discontinuities in the metal mesh define a second boundary between the first routing trace and the second touch electrode. The plurality of second electrical discontinuities can comprise a fourth electrode discontinuity, a fifth electrode discontinuity and a sixth electrical discontinuity defined by different regions of the metal mesh layer. A third axis through locations of the fourth electrical discontinuity and the fifth electrical discontinuity can intersect a fourth axis through locations of the fourth electrical discontinuity and the sixth electrical discontinuity. Additionally or alternatively to one or more of the examples disclosed above, in some examples, the touch screen can further comprise: routing traces corresponding to one or more of the plurality of touch electrodes and including a first routing trace corresponding to the first touch electrode and a second routing trace corresponding to a third touch electrode of the plurality of touch electrodes, the first routing trace adjacent to the second routing trace. Positions of a plurality of third electrical discontinuities in the metal mesh can define a second boundary between the first routing trace and the second routing trace. The plurality of second electrical discontinuities can comprise a fourth electrical discontinuity, a fifth electrical discontinuity, and a sixth electrical discontinuity defined by different regions of the metal mesh layer. A third axis through locations of the fourth electrical discontinuity and the fifth electrical discontinuity can intersect a fourth axis through locations of the fourth electrical discontinuity and the sixth electrical discontinuity. Additionally or alternatively to one or more of the examples disclosed above, in some examples, the metal mesh of the first touch electrode can be at a same electrical potential. The metal mesh of the first touch electrode can include a plurality of electrical discontinuities internal to an area of the first touch electrode. Additionally or alternatively to one or more of the examples disclosed above, in some examples, the plurality of electrical discontinuities internal to the area of the first touch electrode can correspond to the plurality of first electrical discontinuities in the metal mesh defining the first boundary. Additionally or alternatively to one or more of the examples disclosed above, in some examples, a subset of the plurality of electrical discontinuities internal to the area of the first touch electrode corresponding to a sub-region of the area of the first touch electrode can form a pattern of discontinuities, and the pattern of discontinuities can repeat for addition sub-regions of the area of the first touch electrode. Additionally or alternatively to one or more of the examples disclosed above, in some examples, the pattern of discontinuities can repeat for an area of the second touch electrode and/or for an area of a third touch electrode of the plurality of touch electrodes. Additionally or alternatively to one or more of the examples disclosed above, in some examples, one or more of the plurality of first electrical discontinuities in the metal mesh defining the first boundary or one or more of the plurality of electrical discontinuities internal to an area of the first touch electrode can be located within a threshold distance of one or more intersections between metal mesh wires. Additionally or alternatively to one or more of the examples disclosed above, in some examples, the one or more of the plurality of first electrical discontinuities in the metal mesh defining the first boundary or the one or more of the plurality of electrical discontinuities internal to the area of the first touch electrode can be located at or within a threshold distance of a minimum light intensity emitted from a light emitting diode for the metal mesh wires adjacent to the light emitting diode. Additionally or alternatively to one or more of the examples disclosed above, in some examples, the metal mesh of the first touch electrode can comprise one or more notches in one or more metal mesh wires.

Some examples of the disclosure are directed to a portable consumer electronic device. The portable consumer electronic device can comprise: an energy storage device (e.g., a battery); communication circuitry (e.g., wired or wireless); and a touch screen. The touch screen can comprise a plurality of display pixels disposed in a first layer and a plurality of touch electrodes formed of metal mesh disposed in a second layer over the display pixels. The plurality of touch electrodes can comprise a first touch electrode and a second touch electrode adjacent to the first touch electrode. Positions of a plurality of first electrical discontinuities in the metal mesh can define a first boundary between the first touch electrode and the second touch electrode. The plurality of first electrical discontinuities can comprise a first electrical discontinuity, a second electrical discontinuity, and a third electrical discontinuity defined by different regions of the metal mesh layer. A first axis through locations of the first electrical discontinuity and the second electrical discontinuity can intersect a second axis through locations of the first electrical discontinuity and the third electrical discontinuity (non-parallel axes). Additionally or alternatively to one or more of the examples disclosed above, in some examples, a distance between adjacent electrical discontinuities of the electrical discontinuities in the metal mesh defining the first boundary can be less than a length a dimension of a display pixel of the plurality of display pixels. Additionally or alternatively to one or more of the examples disclosed above, in some examples, the portable consumer electronic device can further comprise: a first routing trace corresponding to the first touch electrode, the first routing trace adjacent to the second touch electrode. Positions of a plurality of second electrical discontinuities in the metal mesh can define a second boundary between the first routing trace and the second touch electrode. The plurality of second electrical discontinuities can comprise a fourth electrode discontinuity, a fifth electrode discontinuity and a sixth electrical discontinuity defined by different regions of the metal mesh layer. A third axis through locations of the fourth electrical discontinuity and the fifth electrical discontinuity can intersect a fourth axis through locations of the fourth electrical discontinuity and the sixth electrical discontinuity. Additionally or alternatively to one or more of the examples disclosed above, in some examples, the metal mesh of the first touch electrode can be at a same electrical potential, and the metal mesh of the first touch electrode can include a plurality of electrical discontinuities internal to an area of the first touch electrode. Additionally or alternatively to one or more of the examples disclosed above, in some examples, a subset of the plurality of electrical discontinuities internal to the area of the first touch electrode corresponding to a sub-region of the area of the first touch electrode can form a pattern of discontinuities, and the pattern of discontinuities can repeat for addition sub-regions of the area of the first touch electrode. Additionally or alternatively to one or more of the examples disclosed above, in some examples, one or more of the plurality of first electrical discontinuities in the metal mesh defining the first boundary or one or more of a plurality of electrical discontinuities internal to an area of the first touch electrode can be located within a threshold distance of one or more intersections between metal mesh wires.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
a plurality of display pixels disposed in a first layer; and
a plurality of touch electrodes formed of metal mesh disposed in a second layer, the plurality of touch electrodes comprising a first touch electrode and a second touch electrode adjacent to the first touch electrode, wherein positions of a plurality of first electrical discontinuities in the metal mesh define a first boundary between the first touch electrode and the second touch electrode, such that the first touch electrode and the second touch electrode are non-overlapping and electrically isolated from one another;
wherein the first touch electrode measures self-capacitance at a first location of the touch screen and the second touch electrode measures self-capacitance at a second location, different from the first location, of the touch screen;
wherein the metal mesh of the first of the touch electrodes comprises one or more notches, different from the plurality of first electrical discontinuities, in one or more metal mesh wires of the metal mesh.

2. The touch screen of claim 1, wherein the plurality of display pixels includes a plurality of light emitting diodes, wherein the plurality of light emitting diodes are disposed in the first layer opposite openings in the metal mesh disposed in the second layer.

3. The touch screen of claim 1, wherein the plurality of first electrical discontinuities defining the first boundary comprise:
an electrical discontinuity in the metal mesh between a red light emitting diode and a green light emitting diode;
an electrical discontinuity in the metal mesh between the red light emitting diode and a blue light emitting diode;
an electrical discontinuity in the metal mesh between the green light emitting diode and the blue light emitting diode; or
an electrical discontinuity in the metal mesh between the blue light emitting diode and another blue light emitting diode.

4. The touch screen of claim 1, wherein the plurality of first electrical discontinuities in the metal mesh defining the first boundary comprise:
an electrical discontinuity in the metal mesh between a red light emitting diode and a green light emitting diode;
an electrical discontinuity in the metal mesh between the red light emitting diode and a blue light emitting diode;
an electrical discontinuity in the metal mesh between the green light emitting diode and the blue light emitting diode; and
an electrical discontinuity in the metal mesh between the blue light emitting diode and another blue light emitting diode.

5. The touch screen of claim 1, wherein the metal mesh of the first touch electrode is at a same electrical potential, and wherein the metal mesh of the first touch electrode includes a plurality of electrical discontinuities internal to an area of the first touch electrode.

6. The touch screen of claim 5, wherein the plurality of electrical discontinuities internal to the area of the first touch electrode correspond to the plurality of first electrical discontinuities in the metal mesh defining the first boundary.

7. The touch screen of claim 5, wherein a subset of the plurality of electrical discontinuities internal to the area of the first touch electrode corresponding to a sub-region of the area of the first touch electrode form a pattern of discontinuities, and the pattern of discontinuities repeats for addition sub-regions of the area of the first touch electrode.

8. The touch screen of claim 1, wherein a sum of a number of notches and a number of electrical discontinuities in metal mesh wires corresponding to each light emitting diode of a display pixel of the plurality of display pixels is equal.

9. The touch screen of claim 1, wherein a sum of a number of notches and a number of electrical discontinuities in metal mesh wires corresponding to each display pixel of the plurality of display pixels is equal.

10. The touch screen of claim 1, wherein a first metal mesh wire comprises a first notch on a first side of the first metal mesh wire and a second notch on a second side, opposite the first side, of the first metal mesh wire.

11. The touch screen of claim 10, wherein the first notch on the first side and the second notch on the second side are offset.

12. The touch screen of claim 1, wherein the one or more notches are located within a threshold distance of one or more intersections between metal mesh wires.

13. The touch screen of claim 1, wherein the one or more notches are located at or within a threshold distance of a minimum light intensity emitted from a light emitting diode for the metal mesh wires adjacent to the light emitting diode.

14. A portable consumer electronic device comprising:
an energy storage device;
communication circuitry; and
a touch screen including:
a plurality of display pixels disposed in a first layer; and
a plurality of touch electrodes formed of metal mesh disposed in a second layer, the plurality of touch electrodes comprising a first touch electrode and a second touch electrode adjacent to the first touch electrode, wherein positions of a plurality of first electrical discontinuities in the metal mesh define a first boundary between the first touch electrode and the second touch electrode, such that the first touch electrode and the second touch electrode are non-overlapping and electrically isolated from one another;
wherein the first touch electrode measures self-capacitance at a first location of the touch screen and the second touch electrode measures self-capacitance at a second location, different from the first location, of the touch screen;
wherein the metal mesh of the first of the touch electrodes comprises one or more notches, different from the plurality of first electrical discontinuities, in one or more metal mesh wires of the metal mesh.

15. The portable consumer electronic device of claim 14, wherein a sum of a number of notches and a number of electrical discontinuities in metal mesh wires corresponding to each light emitting diode of a display pixel of the plurality of display pixels is equal.

16. The portable consumer electronic device of claim 14, wherein a sum of a number of notches and a number of electrical discontinuities in metal mesh wires corresponding to each display pixel of the plurality of display pixels is equal.

17. The portable consumer electronic device of claim 14, wherein a first metal mesh wire comprises a first notch on a first side of the first metal mesh wire and a second notch on a second side, opposite the first side, of the first metal mesh wire.

18. The portable consumer electronic device of claim 17, wherein the first notch on the first side and the second notch on the second side are offset.

* * * * *